United States Patent
Chang et al.

(10) Patent No.: US 11,186,065 B2
(45) Date of Patent: Nov. 30, 2021

(54) SURFACE COVERING SYSTEM AND METHOD AND APPARATUS FOR COVERING A SURFACE

(71) Applicant: ARMSTRONG WORLD INDUSTRIES, INC., Lancaster, PA (US)

(72) Inventors: Ying Chang, Lancaster, PA (US); Michelle Wang, Lititz, PA (US)

(73) Assignee: AWI Licensing LLC, Wilmington, DE (US)

( * ) Notice: Subject to any disclaimer, the term of this patent is extended or adjusted under 35 U.S.C. 154(b) by 19 days.

(21) Appl. No.: 16/290,892

(22) Filed: Mar. 2, 2019

(65) Prior Publication Data

US 2019/0270275 A1 Sep. 5, 2019

Related U.S. Application Data

(60) Provisional application No. 62/638,345, filed on Mar. 5, 2018.

(51) Int. Cl.
*B32B 7/06* (2019.01)
*B32B 7/12* (2006.01)

(52) U.S. Cl.
CPC ............ *B32B 7/06* (2013.01); *B32B 7/12* (2013.01); *B32B 2419/04* (2013.01);
(Continued)

(58) Field of Classification Search
CPC ......... B32B 7/06; B32B 7/12; B32B 2419/04; C09J 7/201; C09J 5/00; C09J 2205/302; C09J 2201/128
See application file for complete search history.

(56) References Cited

U.S. PATENT DOCUMENTS 2,760,881 A 8/1956 Toulmin
3,583,889 A 6/1971 Ano et al.
(Continued)

FOREIGN PATENT DOCUMENTS

CN 104234359 A 12/2014
CN 204081362 U 1/2015
(Continued)

OTHER PUBLICATIONS

International Search Report for related PCT/US2019/020456 dated Jun. 24, 2019.
(Continued)

*Primary Examiner* — Patricia L. Nordmeyer
(74) *Attorney, Agent, or Firm* — Craig M. Sterner

(57) ABSTRACT

A surface covering system, a method of covering a surface, and an apparatus for covering a surface. The surface may be a floor, a wall, or a ceiling. In one embodiment, the surface covering system includes a plurality of panels and an adhesive tape that is configured to detachably couple the panels to the surface. The adhesive tape may include a substrate-side adhesive component, a panel-side adhesive component, and a release component between the substrate-side and panel-side adhesive components. The panels may be detachably coupled to the substrate by the adhesive tape such that at least one adhesive layer of the substrate-side adhesive component is adhered to the substrate, at least one adhesive layer of the panel-side adhesive component is adhered to the rear surfaces of the panels, and the release component is between the substrate-side adhesive component and the panel-side adhesive component.

15 Claims, 30 Drawing Sheets

(52) U.S. Cl.
CPC .... *C09J 2203/366* (2020.08); *C09J 2301/124* (2020.08); *Y10T 428/14* (2015.01)

(56) References Cited

U.S. PATENT DOCUMENTS

| | | | |
|---|---|---|---|
| 3,788,941 A * | 1/1974 | Kupits | D06N 7/0071 |
| | | | 428/352 |
| 3,863,412 A | 2/1975 | Bodycomb et al. | |
| 3,962,504 A | 6/1976 | Sherwin | |
| 4,069,639 A | 1/1978 | Lindner et al. | |
| 4,079,554 A | 3/1978 | Terwilliger | |
| 4,157,410 A | 6/1979 | McClintock | |
| 4,554,193 A | 11/1985 | Erickson | |
| 4,554,769 A | 11/1985 | Fujii et al. | |
| 4,744,189 A | 5/1988 | Wilson | |
| 4,804,569 A | 2/1989 | Arisawa | |
| 4,824,498 A * | 4/1989 | Goodwin | A47G 27/0468 |
| | | | 156/71 |
| 4,900,604 A | 2/1990 | Martinez et al. | |
| 5,069,969 A | 12/1991 | McClintock et al. | |
| 5,116,439 A * | 5/1992 | Raus | A47G 27/0437 |
| | | | 156/71 |
| 5,887,389 A | 3/1999 | Light | |
| 5,974,753 A | 11/1999 | Hsu | |
| 6,001,471 A | 12/1999 | Bries et al. | |
| 6,660,120 B2 | 12/2003 | Neuburger et al. | |
| 8,590,269 B2 | 11/2013 | D'Agostino | |
| 8,753,730 B1 | 6/2014 | Dunlap et al. | |
| 8,980,426 B2 | 3/2015 | Farrage, Jr. et al. | |
| 9,539,797 B2 | 1/2017 | Heinemann | |
| 9,617,740 B2 | 4/2017 | Bowden et al. | |
| 9,668,595 B2 | 6/2017 | Floyd et al. | |
| 9,745,757 B2 * | 8/2017 | Schauer | B32B 27/36 |
| 9,785,185 B2 | 10/2017 | Rundle et al. | |
| 2002/0004130 A1 | 1/2002 | Lhila | |
| 2002/0009568 A1 * | 1/2002 | Bries | C09J 7/20 |
| | | | 428/40.1 |
| 2002/0174615 A1 | 11/2002 | Bell | |
| 2004/0048025 A1 | 3/2004 | Lohnes | |
| 2006/0243388 A1 | 11/2006 | Kubiak et al. | |
| 2009/0071097 A1 | 3/2009 | McDonald | |
| 2009/0233034 A1 | 9/2009 | Saunders | |
| 2012/0324822 A1 | 12/2012 | Giammarco | |
| 2013/0186029 A1 | 7/2013 | Tuttle | |

FOREIGN PATENT DOCUMENTS

| | | |
|---|---|---|
| CN | 106088513 A | 11/2016 |
| EP | 2320006 A1 | 5/2011 |
| EP | 2436515 A1 | 4/2012 |
| GB | 2344360 A | 6/2000 |
| SE | 424653 B | 8/1982 |
| WO | WO 97/14855 | 4/1997 |
| WO | WO 98/20086 | 5/1998 |
| WO | WO 2009/123438 | 10/2009 |

OTHER PUBLICATIONS

3M VHB Tapes and Double-Sided Foam Tapes Selection Guide, 3M Australia Pty Limited, 2013.

\* cited by examiner

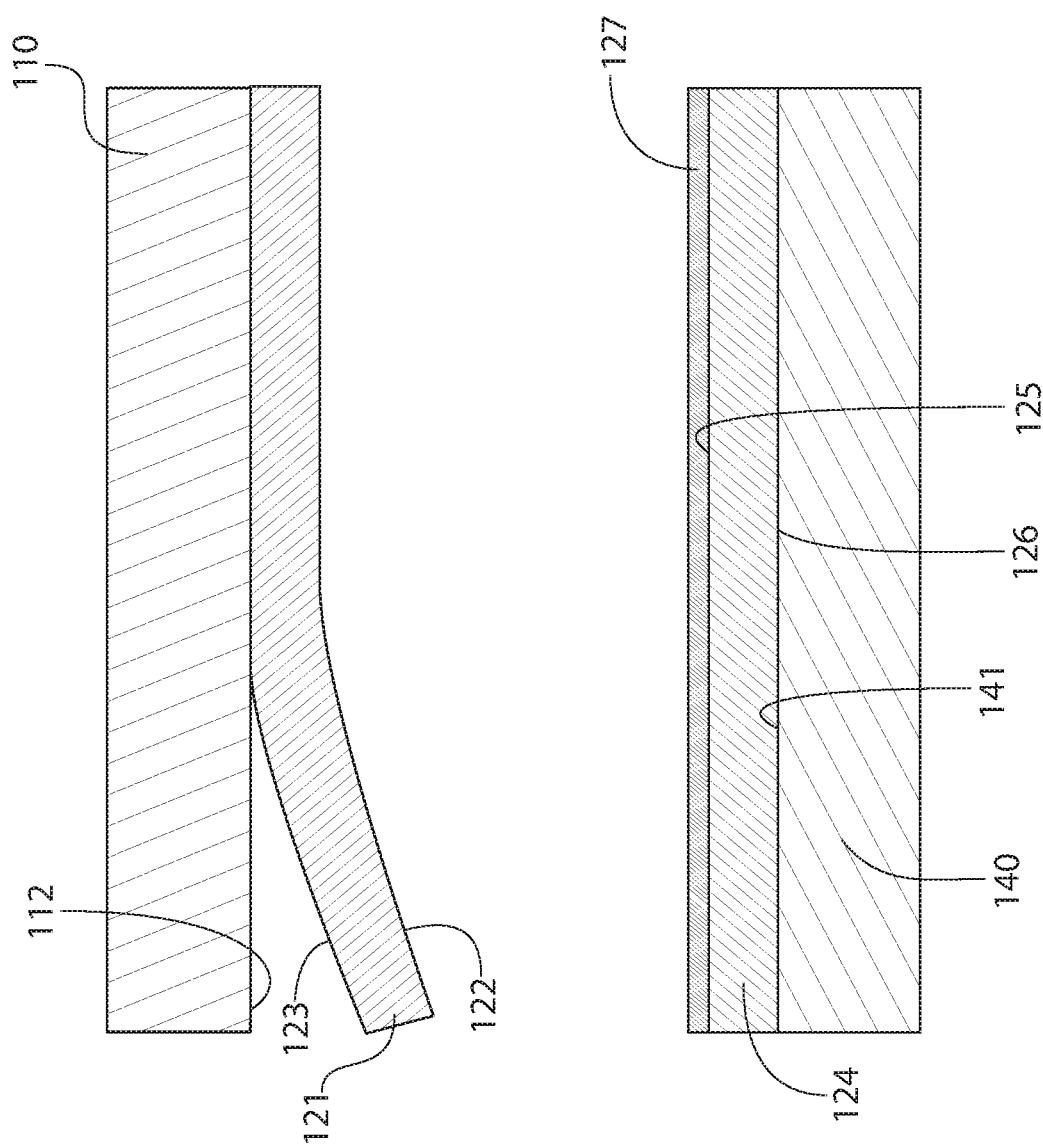

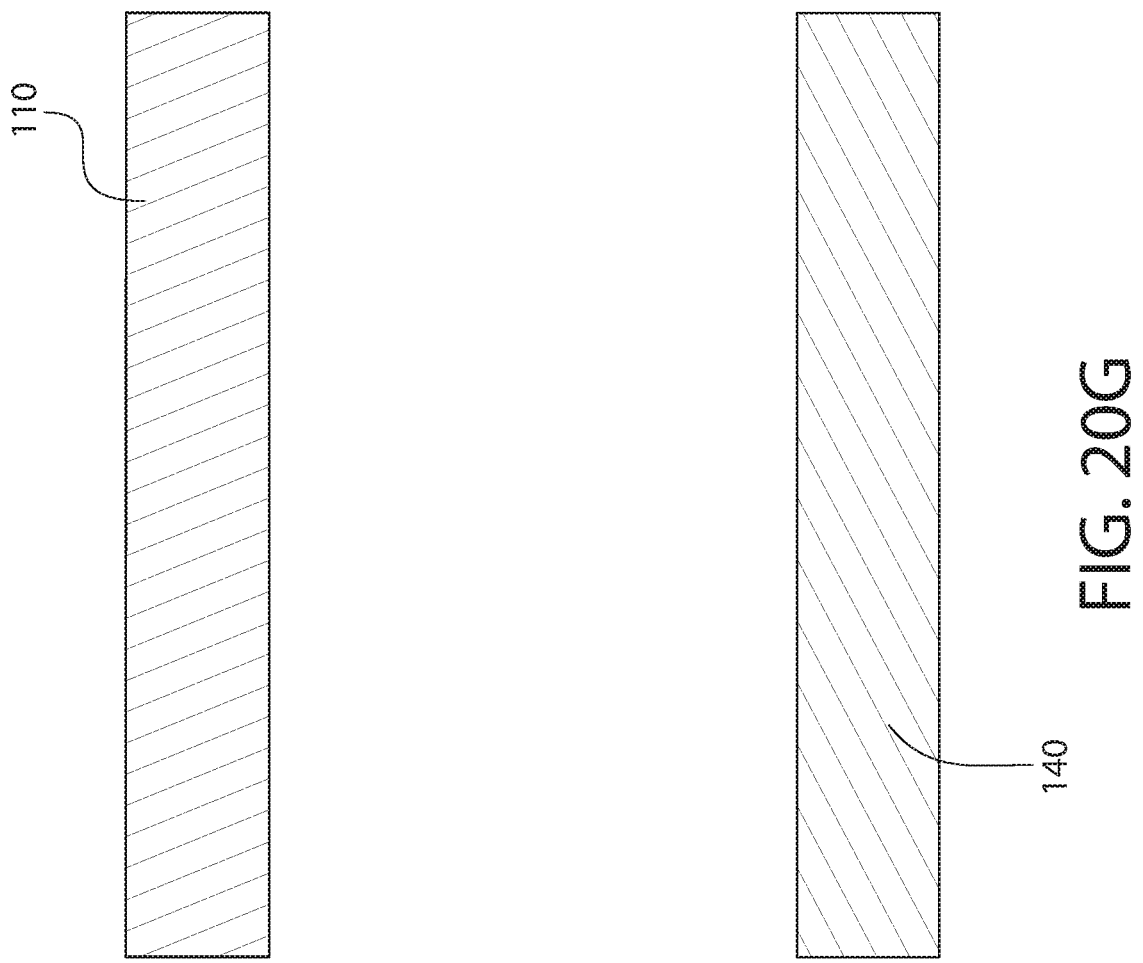

SURFACE COVERING SYSTEM AND METHOD AND APPARATUS FOR COVERING A SURFACE

CROSS-REFERENCE TO RELATED APPLICATIONS

The present application claims priority to U.S. Provisional Patent Application Ser. No. 62/638,345, filed Mar. 5, 2018, the entirety of which is incorporated herein by reference.

BACKGROUND

Surface coverings are used for a variety of reasons, including to cover up imperfections in an underlying surface and to display a desired aesthetic. Examples of such surface coverings includes flooring that covers a subfloor, ceiling panels that cover a ceiling, and wall panels that cover a wall. Typically, such surface coverings are permanently installed on the underlying surface such that removal of the surface covering results in damage to the underlying surface and/or damage to the surface covering. This can be expensive as it requires the underlying surface to be repaired before another surface covering is placed thereon if so desired. Furthermore, the surface coverings are not able to be reused because they become damaged during their removal. Thus, a need exists for a surface covering system that enables the surface covering to be removed from the underlying surface without causing damage to the underlying surface and/or the surface covering.

SUMMARY

The present invention is directed to a surface covering system, a method of covering a surface, and an apparatus for covering a surface. The surface may be a floor, a wall, or a ceiling and the component that covers the surface may be a panel, a flooring, or the like. Thus, in one embodiment the surface covering system includes a plurality of panels and an adhesive tape that is configured to detachably couple the panels to the surface. The adhesive tape may include a substrate-side adhesive component, a panel-side adhesive component, and a release component between the substrate-side and panel-side adhesive components.

In one aspect, the invention may be a surface covering system comprising: a plurality of panels, each of the panels comprising a front surface and a rear surface opposite the front surface; an adhesive tape configured to detachably couple the panels to a substrate, the adhesive tape comprising: a substrate-side adhesive component comprising at least one adhesive layer; a panel-side adhesive component comprising at least one adhesive layer; and a release component; wherein the panels are detachably coupled to the substrate by the adhesive tape in a side-by-side arrangement to cover the substrate, the at least one adhesive layer of the substrate-side adhesive component being adhered to the substrate, the at least one adhesive layer of the panel-side adhesive component being adhered to the rear surfaces of the panels, and the release component being positioned between the substrate-side adhesive component and the panel-side adhesive component.

In another aspect, the invention may be a surface covering system comprising: a plurality of panels; a first connection component comprising a first adhesive layer and a first connection layer, the first connection component configured to be coupled to each of the panels by the first adhesive layer; a second connection component comprising a second adhesive layer and a second connection layer, the second connection component configured to be coupled to a substrate by the second adhesive layer; and wherein the panels are configured to be detachably coupled to the substrate in a side-by-side arrangement to cover the substrate via interaction between the first connection layer of the first connection component and the second connection layer of the second connection component.

In yet another aspect, the invention may be a surface covering system comprising: a plurality of panels, each of the panels comprising a front surface and a rear surface opposite the front surface, the rear surface comprising a fibrous material; an adhesive tape comprising at least one adhesive layer coupled to a substrate; wherein the panels are detachably coupled to the substrate with the rear surface of the panels adhered to the adhesive tape; and wherein the panels and the adhesive tape are configured so that upon detaching the panels from the substrate the adhesive tape remains coupled to the substrate, and wherein the adhesive tape is configured to be separated from the substrate without damaging the substrate.

In still another aspect, the invention may be a surface covering system comprising: a plurality of panels; an adhesive tape configured to detachably couple the panels to a substrate, the adhesive tape comprising a first adhesive layer having a first adhesive strength, a second adhesive layer having a second adhesive strength, and a third adhesive layer having a third adhesive strength, the third adhesive layer being located between the first and second adhesive layers; and wherein the third adhesive strength is less than at least one of the first and second adhesive strengths.

In a further aspect, the invention may be a surface covering system comprising: a plurality of panels; an adhesive tape configured to detachably couple the panel to a substrate, the adhesive tape comprising a first adhesive layer having a first adhesive strength, a second adhesive layer having a second adhesive strength, and a third adhesive layer having a third adhesive strength; wherein the panels are detachably coupled to the substrate by the adhesive tape, the first adhesive layer being adhered to a rear surface of the panel, the second adhesive layer being adhered to the substrate, and the third adhesive layer being located between the first and second adhesive layers; and wherein the second adhesive strength is greater than at least one of the first and third adhesive strengths.

In a still further aspect, the invention may be a method of covering a surface, the method comprising: a) providing a plurality of panels, each of the panels comprising a rear surface; b) providing an adhesive tape comprising a substrate-side adhesive component, a panel-side adhesive component, and a release component; and c) coupling the panels to a substrate with the adhesive tape in a side-by-side arrangement to cover the substrate, the substrate-side adhesive component being adhered to the substrate, the panel-side adhesive component being adhered to the rear surface of the panels, and the release component being located between the substrate-side adhesive component and the panel-side adhesive component.

In another aspect, the invention may be a method of covering a surface, the method comprising: a) providing a plurality of panels, each of the panels comprising a rear surface having a panel-side adhesive component coupled thereto; b) coupling a substrate-side adhesive component to a substrate, wherein a release component is coupled to an outer surface of one of the panel-side and substrate-side adhesive components; and c) coupling the panels to the substrate with the panel-side and substrate-side adhesive components, the panels being placed in a side-by-side arrangement to cover the substrate, the release component being located between the panel-side and substrate-side adhesive components.

In yet another aspect, the invention may be a method of covering a surface, the method comprising: a) providing a panel comprising a rear surface having an adhesive tape thereon, the adhesive tape comprising a panel-side adhesive component, a substrate-side adhesive component, and a release component located between the panel-side adhesive component and the substrate-side adhesive component; and b) coupling the panel to the substrate with the adhesive tape, the substrate-side adhesive component being adhered to the substrate and the panel-side adhesive component being adhered to the rear surface of the panel.

In still another aspect, the invention may be an apparatus for covering a surface, the apparatus comprising: a panel comprising a rear surface; an adhesive tape coupled to the rear surface of the panel, the adhesive tape comprising: a panel-side adhesive component comprising at least one adhesive layer adhered to the rear surface of the panel; a substrate-side adhesive component comprising at least one adhesive layer; and a release component positioned between the panel-side adhesive component and the substrate-side adhesive component.

In a further aspect, the invention may be an adhesive tape comprising: a laminate structure comprising a first surface and a second surface opposite the first surface, the laminate structure comprising: a first adhesive layer forming the first surface of the laminate structure, the first adhesive layer having a first adhesive strength; a second adhesive layer forming the second surface of the laminate structure, the second adhesive layer having a second adhesive strength; and a third adhesive layer positioned between the first and second adhesive layers and having a third adhesive strength, the third adhesive strength being less than at least one of the first and second adhesive strengths.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplary embodiments of the present invention will be described with reference to the following drawings, where like elements are labeled similarly, and in which:

FIGS. 20D-20G illustrate a method of removing the panel from the surface;

Figure 1:
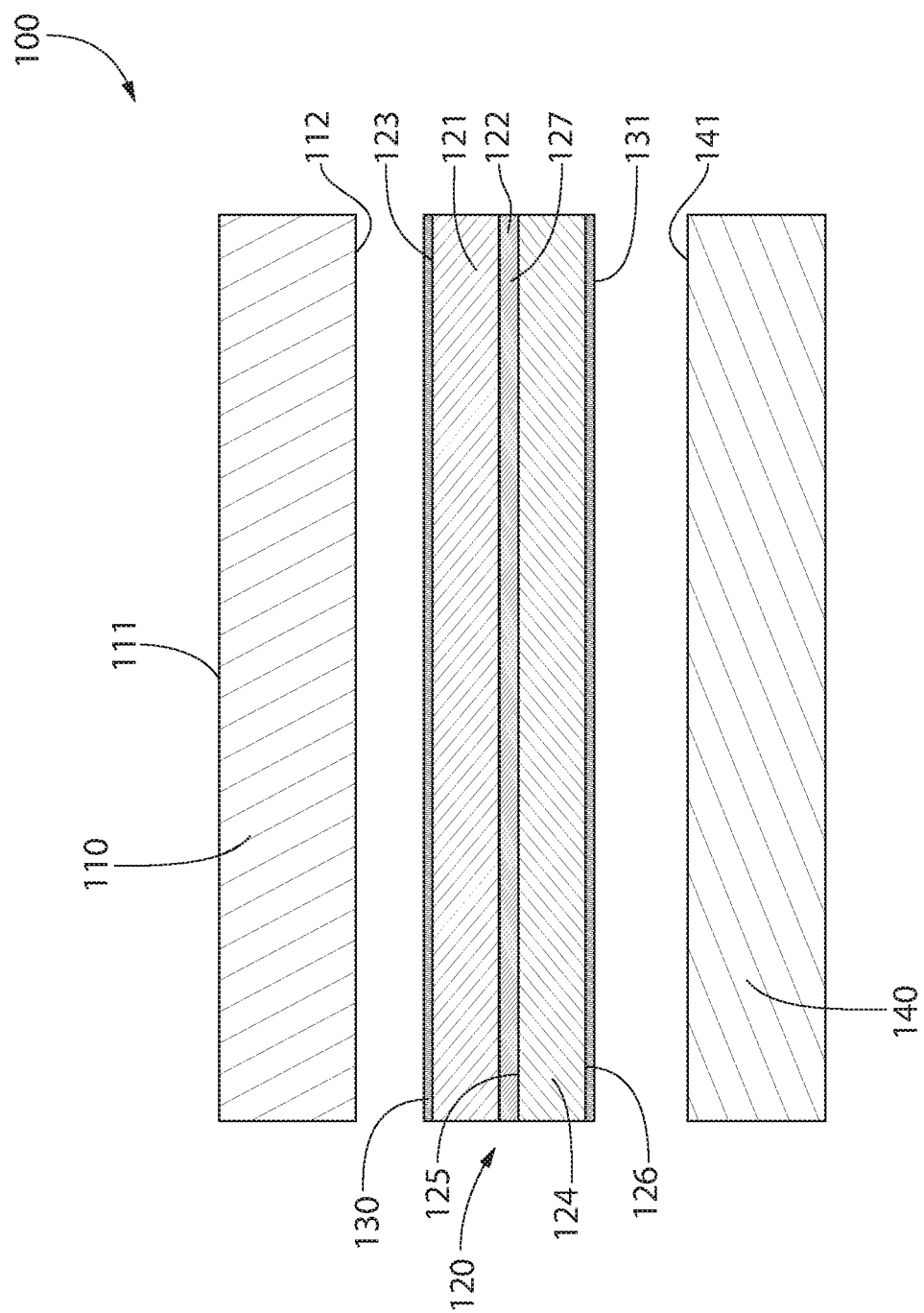
FIG. 1 is schematic view of a surface covering system including a panel, an adhesive tape, and a substrate in accordance with an embodiment of the present invention, wherein the adhesive tape is separate from the panel and the substrate.

All drawings are schematic and not necessarily to scale. Parts given a reference numerical designation in one figure may be considered to be the same parts where they appear in other figures without a reference numerical designation for brevity unless specifically labeled with a different part number and described herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring first to FIG. 1, a surface covering system 100 is illustrated in accordance with an embodiment of the present invention. The surface covering system 100 generally comprises a panel 110, an adhesive tape 120, and a substrate 140. In some embodiments, the invention may be directed to an installation kit that includes the panel 110 and the adhesive tape 120 and in other embodiments the invention may be directed to the adhesive tape 120 by itself. In embodiments that are directed to the installation kit, the adhesive tape 120 may be prefabricated onto the panel 110 by the manufacturer such that the panel 110 is sold with the adhesive tape 120 (or portions thereof) already attached to it, or the panel 110 and the adhesive tape 120 may be sold as separate components that are intended to be coupled together by the consumer at the installation site.

The panel 110 is configured to be coupled or attached to the substrate 140 using the adhesive tape 120. Although FIG. 1 only illustrates one of the panels 110 being coupled to the substrate 140, in certain embodiments the surface covering system 100 comprises a plurality of the panels 110, each of which is detachably coupled to the substrate 140 (see, for example, FIGS. 23 and 24). Thus, in accordance with the invention set forth herein, a plurality of the panels 110 may be coupled to the substrate 140 using the adhesive tape 120, as discussed more fully herein. Specifically, a plurality of the panels 110 may be detachably coupled to the substrate 140 (using the adhesive tape 120) in a side-by-side arrangement so that the panels 110 collectively cover the substrate 140. As used herein, covering the substrate 140 includes partially covering the substrate 140 and/or covering an entirety of the substrate 140. A user can cover as much of the substrate 140 as he/she desires using one or more of the panels 110 and the installation techniques described herein. The substrate 140 has an exposed outer surface 141 that is covered by the panels 110 as described herein.

The substrate 140 may be any surface that it may be desirable to cover with one or more of the panels 110. For example, the substrate 140 may be a subfloor to which flooring is attached, a wall to which wall panels are attached, or a ceiling to which ceiling panels are attached. The substrate 140 may be an interior wall (such as drywall, wood, or the like) or an exterior wall (such as siding, stucco, concrete, brick, wood, or the like) Thus, the substrate 140 may be formed of a variety of different materials or compositions, including without limitation wood, metal, brick, plastic, fabric, fibrous sheet, glass, ceramic, concrete, plastic film/sheet, paper, medium density fiberboard, fiberglass, mineral fiber sheet, drywall, or the like. In certain embodiments the substrate 140 may be drywall that may or may not be covered with paint, wallpaper, or the like. The substrate 140 is illustrated as being flat/planar in the exemplified embodiment, but the invention is not to be so limited in all embodiments and the substrate 140 may be curved in alternative embodiments. Furthermore, the substrate 140 may be horizontal (such as when the substrate is a floor or a ceiling), vertical (such as when the substrate 140 is a wall), or oriented at an angle. The exposed outer surface 141 of the substrate 140 may be a smooth surface, a textured surface, or the like in various embodiments.

The panel 110 comprises a front surface 101 and a rear surface 102 opposite the front surface 101. Any of the panels 110 described herein may be formed into any desired shape, including without limitation circular, square, rectangular, pentagonal, hexagonal, octagonal, irregular shapes, or the like. The panel 110 may be formed into any size, shape, or pattern and may have any desired thickness. Furthermore, the panel 110 may be made of any desired material, including without limitation wood, metal, brick, plastic, fabric, fibrous sheet, glass, ceramic, concrete, plastic film/sheet, paper, medium-density fiberboard, fiberglass, mineral fiber sheet, or the like. In certain preferred embodiments, the panel 110 may be formed from wood, medium-density fiberboard, or a fibrous sheet with dimensional stability and other functional performances. For example, in some embodiments the panel 110 may have acoustic properties such that the panels 110 can enhance the acoustics within an interior space. In some embodiments the panel 110 may have aesthetic features, such as by having the front surface 111, which is exposed when the panel 110 is coupled to the substrate 140, comprising a specific color, pattern, texture, or surface finish.

In the embodiment shown in FIG. 1, the adhesive tape 120 is an integral laminate structure comprising a panel-side adhesive component 121 having a first surface 122 and a second surface 123 opposite the first surface 122, a substrate-side adhesive component 124 having a first surface 125 and a second surface 126 opposite the first surface 125, and a release component 127 having a first surface 128 and a second surface 129 opposite the first surface 128. As discussed more below, in other embodiments the panel-side adhesive component 121 may not be integral with the substrate-side adhesive component 124, but rather these may be separate components that are only attached to one another when the panels 110 are being installed on the substrate 140. Thus, the panel-side adhesive component 121 and the substrate-side adhesive component 124 may be maintained separately (such as in rolls or the like) until such time as they are needed to couple the panel 110 to the substrate 140. In embodiments that maintain the panel-side and substrate-side adhesive components 121, 124 separately from one another, the release component 127 may be attached to one of the panel-side or substrate-side adhesive components 121, 124 or the release component may also be maintained separate from the panel-side and substrate-side adhesive components 121, 124. Regardless, when the panel 110 is coupled to the substrate 140, the panel-side adhesive component 121, the substrate-side adhesive component 124, and the release component 127 are coupled together and collectively form the adhesive tape 120.

In the exemplified embodiment, the panel-side adhesive component 121, the substrate-side adhesive component 124, and the release component 127 are arranged in the adhesive tape 120 so that the release component 127 is positioned in between the panel-side and substrate-side adhesive components 121, 124. More specifically, the first surface 122 of the panel-side adhesive component 121 faces, and in the exemplified embodiment is adhered to, the first surface 128 of the release component 127 and the first surface 125 of the substrate-side adhesive component 124 faces, and in the exemplified embodiment is adhered to, the second surface 129 of the release component 127. This enhances the ability of the adhesive tape 120 to separate at the release component 127 so that the panel-side and substrate-side adhesive components 121, 124 may be separated from one another when removing an installed panel 110 from the substrate 140, as described more fully below. Furthermore, in the exemplified embodiment a first release liner 130 covers the second surface 122 of the panel-side adhesive component 121 and a second release liner 131 covers the second surface 126 of the substrate-side adhesive component 124. However, in other embodiments one or both of the first and second release liners 130, 131 may be omitted. In some embodiments, the adhesive tape 120 may be self-wound roll that only requires a single peelable liner having a release coating on both sides.

In the embodiment of FIG. 1, the panel-side adhesive component 121 and the substrate-side adhesive component 124 are illustrated as a single layer. In some embodiments, the panel-side and substrate-side adhesive components 121, 124 may comprise a single layer. However, the invention is not to be so limited and at least one, or possibly both, of the panel-side and substrate-side adhesive components 121, 124 may comprise multiple layers in other embodiments, some examples of which are described herein below. Thus, the panel-side and substrate-side adhesive components 121, 124 may be shown as a single layer for simplicity even if they actually comprise multiple layers. Furthermore, although the release component 127 is illustrated in FIG. 1 as a single layer component, in other embodiments it may also be a multi-layered structure, some examples of which are also described herein below. Thus, the panel-side adhesive component 121 and the substrate-side adhesive component 124 each comprise at least one adhesive layer. In some embodiments described herein at least one, or possibly both, of the panel-side adhesive component 121 and the substrate-side adhesive component 124 may comprise multiple adhesive layers that are separated by a carrier layer (see, for example, FIG. 13). Different embodiments of the panel-side and substrate-side adhesive components 121, 124 comprising a single adhesive layer and multiple adhesive layers are depicted in FIGS. 5-22.

Whether the panel-side and substrate-side adhesive components 121, 124 comprise one or more adhesive layers, the first and second surfaces 122, 123, 125, 126 of the panel-side and substrate-side adhesive components 121, 124 are adhesive surfaces. An adhesive surface is a surface that is able to stick to another surface or object because the adhesive surface is either formed by or comprises an adhesive material. In certain embodiments, the first and second surfaces 122, 123 of the panel-side adhesive component 121 are formed from an adhesive material. This can be due to a single adhesive layer forming the first and second surfaces 122, 123 or a first adhesive layer forming the first surface 122 and a second adhesive layer forming the second surface 123. Regardless, the first surface 122 of the panel-side adhesive component 121 should be an adhesive surface to facilitate coupling of the panel-side adhesive component 121 to the release component 127 and the second surface 123 of the panel-side adhesive component 121 should be an adhesive surface to facilitate coupling of the panel-side adhesive component 121 to the panel 110. Similarly, in certain embodiments the first and second surfaces 125, 126 of the substrate-side adhesive component 124 are formed from an adhesive material. This can be due to a single adhesive layer forming the first and second surfaces 125, 126 or a first adhesive layer forming the first surface 125 and a second adhesive layer forming the second surface 126. Regardless, the first surface 125 of the substrate-side adhesive component 124 should be an adhesive surface to facilitate coupling of the substrate-side adhesive component 124 to the release component 127 and the second surface 126 of the substrate-side adhesive component 125 should be an adhesive surface to facilitate coupling of the substrate-side adhesive component 124 to the exposed outer surface 141 of the substrate 140. In one embodiment, at least one of the first surface 122 of the panel-side adhesive component 121 and the first surface 125 of the substrate-side adhesive component 124 is an adhesive surface to allow the panel-side and substrate-side adhesive components 121, 124 to be coupled to one another, although it is preferred that both be adhesive surfaces due to the release component 127 being located between the first surfaces 122, 125 of the panel-side and substrate-side adhesive components 121, 124.

For each embodiment described herein, the adhesive layers can be formed from or comprise any type of adhesive material, such as acrylic, synthetic or natural rubber, acrylate, ethylene-vinyl acetate, hot-melt, nitriles, silicon rubbers, styrene block copolymers, or the like. Functional additives such as heat stabilizer, light stabilizer, tackifier, flame retardant, pigment, and filler could also be included in these adhesive layers. Each of the adhesive layers may have a thickness of between 0.1-100 mils, preferably between 0.5-5 mils, and more preferably between 0.5-3 mils. For embodiments that utilize a multi-layer adhesive construction, each layer of adhesive may have the same composition and thickness or a different composition and/or thickness. In some embodiments, as described more fully below, it may be preferable to have a differentiated adhesive strength for each adhesive layer such that an internal adhesive layer has a lower adhesive strength than an external adhesive layer.

Furthermore, unless specified in the claims, each adhesive layer can be a permanent adhesive or a removable adhesive. A permanent adhesive is one that cannot be separated from the surface to which it is attached without damaging that surface whereas a removable adhesive is one that can be separated from the surface to which it is attached without damaging that surface. In some embodiments, it may be desirable for the substrate-side adhesive component 124 to be removable from the substrate 140 and in some embodiments it may be desirable for the panel-side adhesive component 121 to be removable from the panel 110. In that regard, it may be desirable for an adhesive layer of the substrate-side adhesive component 124 that adheres to the substrate 140 to be a removable adhesive so that it can be readily removed from the substrate 140 without damaging the substrate. Similarly, it may be desirable for an adhesive layer of the panel-side adhesive component 121 that adheres to the panel 110 to be a removable adhesive so that it can be readily removed from the panel 110 without damaging the panel 110. This concept will be discussed more fully below. A removable adhesive is one that can be removed by peeling or other methods without causing damage to the surface to which the adhesive is adhered. Stated another way, a removable adhesive can be removed with a lower force than the force required to damage the surface on which the adhesive is adhered.

As noted above and described in more detail below, the adhesive material may be manufactured and applied onto a suitable carrier using common coating or laminating processes. There are embodiments of the invention described below that illustrate these layers, referred to herein as carrier layers. Such carrier layers may have functions that include increased handling strength, cushioning, increased holding power, protection of the adhesive and interface, gap filler, impact resistance, and the like. Examples of the materials that may be used for the carrier layers include foam, plastic film, paper, woven or non-woven sheets, metal foil, fibrous sheets, or the like. Such carrier layers may have a thickness of between 0.1 mil and 1 inch, and more specifically between 0.5 mils and 100 mils.

The release component 127 may comprise any material that facilitates separation of the panel-side adhesive component 121 from the substrate-side adhesive component 124, as described more fully herein. Specifically, as noted above the release component 127 is positioned directly between the first surface 122 of the panel-side adhesive component 121 and the first surface 125 of the substrate-side adhesive component 124, both of which are adhesive surfaces. As will be discussed more fully below, the bond strength between the release component 127 and at least one of the panel-side and substrate-side adhesive components 121, 124 is less than the bond strength between the panel-side adhesive component 121 and the panel 110 and between the substrate-side adhesive component 124 and the substrate 140. As a result, upon a removal force being applied onto the panel 110 to remove the panel 110 from the substrate 140, the panel-side adhesive component 121 will separate from the substrate-side adhesive component 124 at the release component 127. Generally, this means that either the panel-side adhesive component 121 will separate from the release component 127 while the release component 127 remains attached to the substrate-side adhesive component 124 or the substrate-side adhesive component 121 will separate from the release component 127 and the release component 127 remains attached to the panel-side adhesive component 121. Alternatively, the release component 127 may separate from itself so that part of the release component 127 remains attached to the panel-side adhesive component 121 and the remainder of the release component 127 remains attached to the substrate-side adhesive component 124.

In some embodiments, the release component 127 may comprise a release coating that is silicone-based or non-silicone-based. Such non-silicone-based release coatings include solvent-based coatings, polypropylene and polyethylene extrudable release coatings, water-based coatings, or the like. In other embodiments described herein, the release component 127 may comprise an adhesive layer comprising an adhesive material having an adhesive strength that is less than an adhesive strength of at least one adhesive layer of the panel-side adhesive component 121 and/or the substrate-side adhesive component 124. These variations will be discussed in the different embodiments provided herewith.

Figure 2:
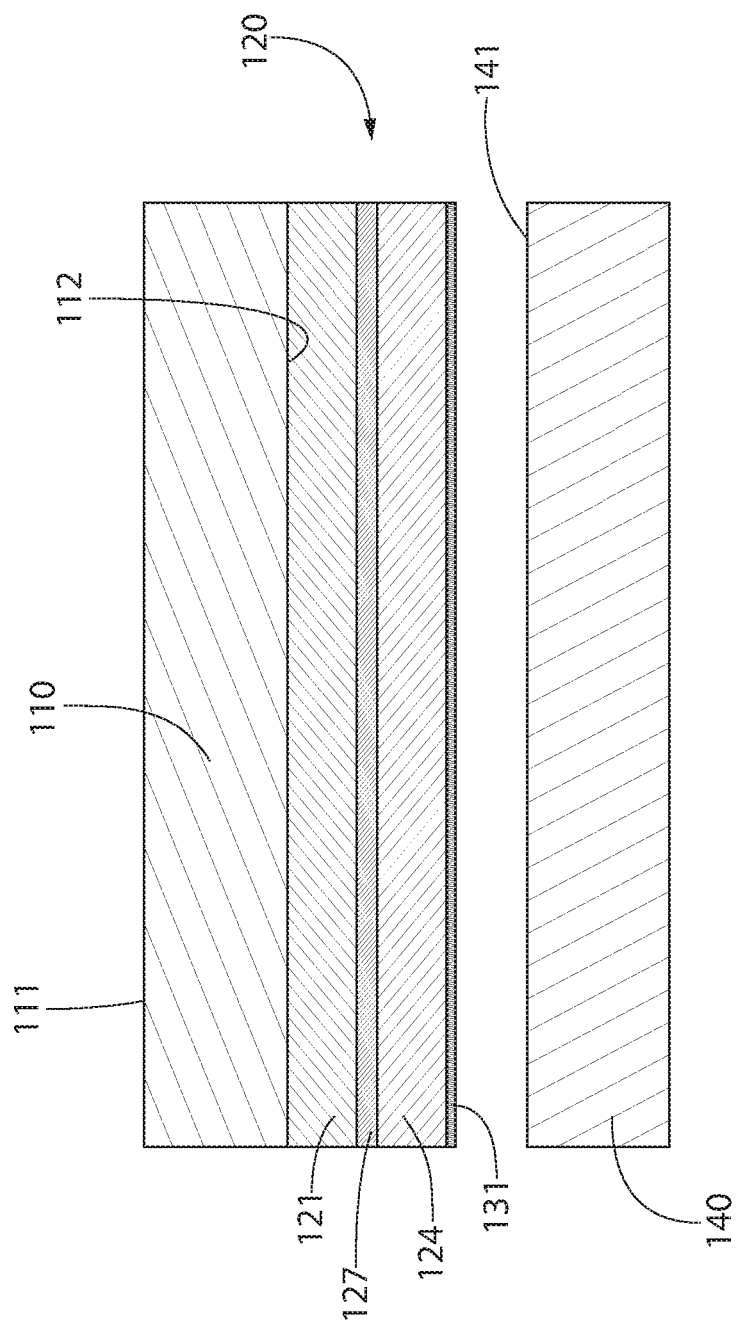
FIG. 2 is a schematic view of the surface covering system of FIG. 1 wherein the adhesive tape is adhered to the panel.

In FIG. 1, the adhesive tape 120 is an integral structure as noted above. Such an adhesive tape 120 may be maintained in a rolled-up configuration (or any other desired configuration, such as being maintained in strip-like form or the like) until its desired use, at which time the adhesive tape 120 or a portion thereof may be unrolled and cut if needed for use in coupling the panels 110 to the substrate 140. The adhesive tape 120, when an integral structure as shown in FIG. 1, may be used to couple the panel 110 to the substrate 140 in one of two ways. The first way includes first removing the first peelable liner 130 from the second surface 123 of the panel-side adhesive component 121. Next, the remainder of the adhesive tape 120 may be coupled to the rear surface 112 of the panel 110 by placing the second surface 123 of the panel-side adhesive component 121 (which is adhesive) into contact with the rear surface 112 of the panel 110, thereby adhering the adhesive tape 120 to the panel 110. This is illustrated in FIG. 2. The panel 110 with the adhesive tape 120 thereon can then be coupled to the substrate 140.

Figure 3:
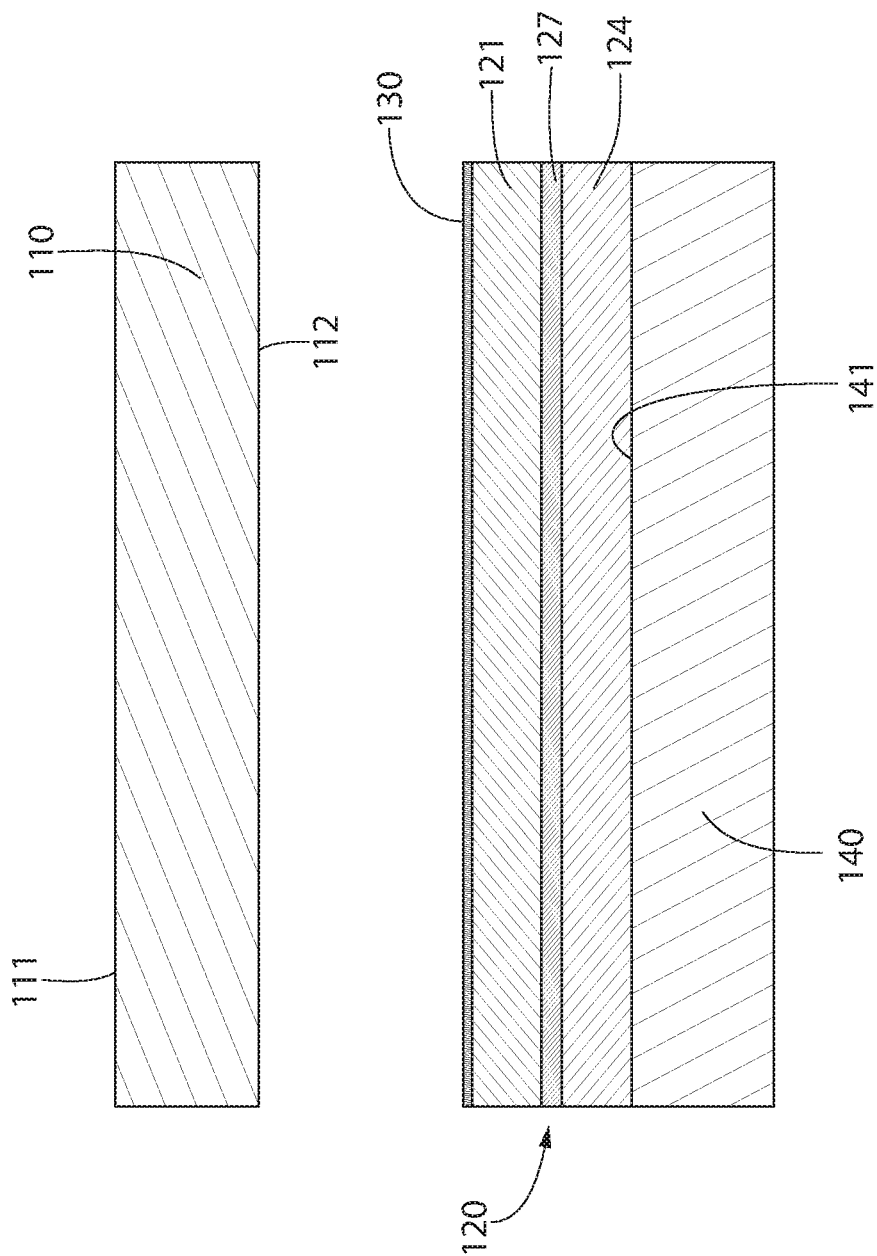
FIG. 3 is a schematic view of the surface covering system of FIG. 1 wherein the adhesive tape is adhered to the substrate.

The second way that the adhesive tape 120 may be used to couple the panel 110 to the substrate 140 is by first removing the second peelable liner 131 from the second surface 126 of the substrate-side adhesive component 124 and then coupling the remainder of the adhesive tape 120 to the exposed outer surface 141 of the substrate 140. In this embodiment, the adhesive tape 120 is coupled to the substrate 140 by adhering the second surface 126 of the substrate-side adhesive component 124 (which is adhesive) to the exposed outer surface 141 of the substrate 140. This is illustrated in FIG. 3. Next, the first peelable liner 130 would be removed from the panel-side adhesive component 121 and the panel 110 would be adhered to the panel-side adhesive component 121 to couple the panel 110 to the substrate 140.

In one embodiment, the panel 110 and the adhesive tape 120 may be maintained separate from one another until a user couples the adhesive tape 120 to the panel 110. In another embodiment, the adhesive tape 120 (or just the panel-side adhesive component 121 thereof) may be prefabricated onto the rear surface 111 of the panel 110 such that a panel apparatus that comprises the panel 110 and the adhesive tape 120 (without the first peelable liner 130) is formed. In such an embodiment, the panel apparatus may be sold with the adhesive tape 120 (or portion thereof) already coupled to the panel 110. Such a panel apparatus may include the second peelable liner 131 but not the first peelable liner (as shown in FIG. 2).

Figure 4:
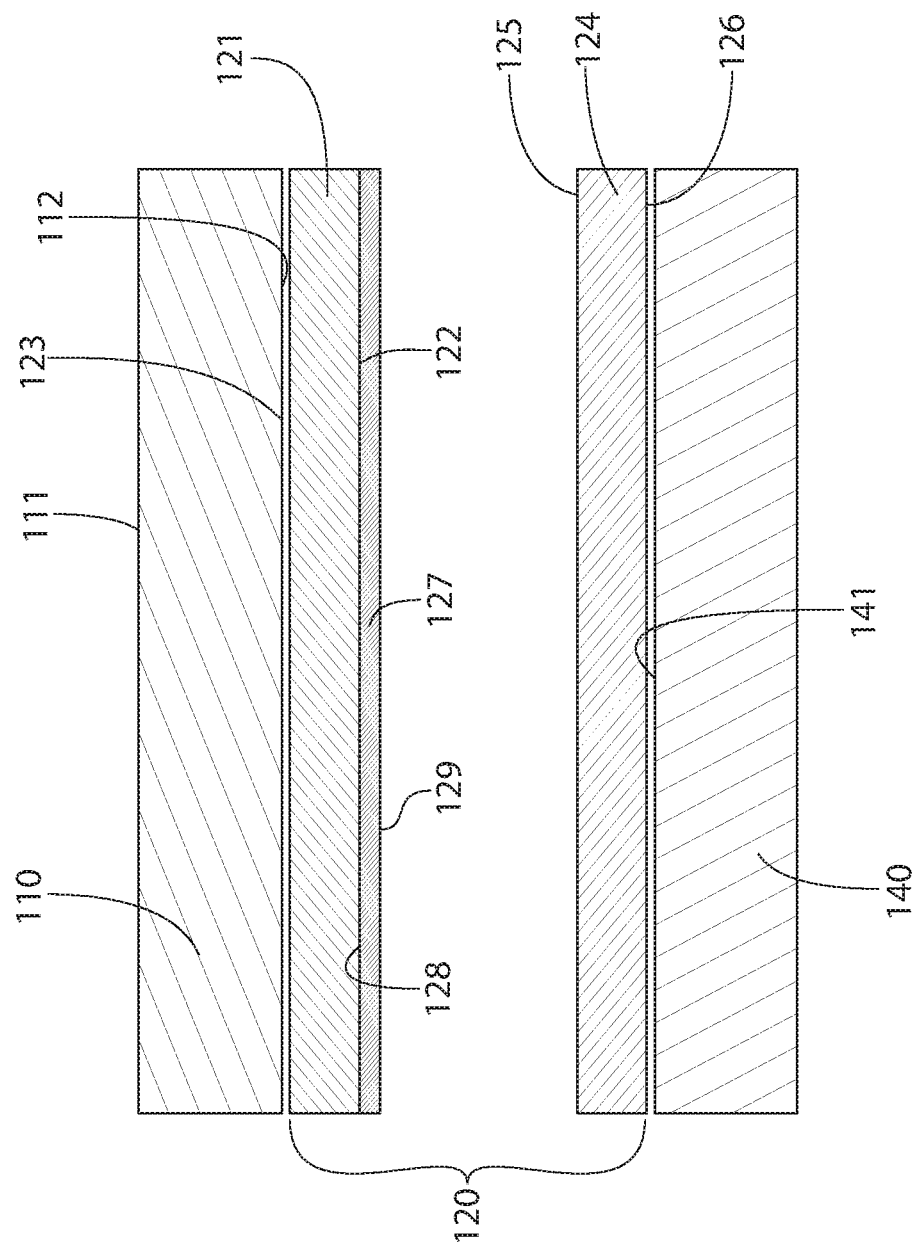
FIG. 4 is a schematic view of the surface covering system of FIG. 1 wherein a substrate-side adhesive component of the adhesive tape is coupled to the substrate and a panel-side adhesive component of the adhesive tape is coupled to the panel.

Referring to FIG. 4, the adhesive tape 120 is illustrated such that the panel-side adhesive component 121 and the substrate-side adhesive component 124 are separate from one another. Thus, the panel-side adhesive component 121 and the substrate-side adhesive component 124 may be maintained separately from one another until a user desires to use the panel-side and substrate-side adhesive components 121, 124 to couple the panel 110 to the substrate 140. Each of the panel-side and substrate-side adhesive components 121, 124 may be maintained in a rolled-up configuration (or any other desired configuration, such as being maintained in strip-like form or the like) prior to their use. The adhesive tape 120 may include one or more peelable liners (not shown) on each exposed surface to maintain the integrity of the adhesive tape 120 while it is being stored prior to use.

In the embodiment illustrated in FIG. 4, the release component 127 is coupled to the first surface 122 of the panel-side adhesive component 121. However, in other embodiments the release component 127 may instead be coupled to the first surface 125 of the substrate-side adhesive component 124. The release component 127 may be pre-fabricated onto one of the panel-side and substrate-side adhesive components 121, 124, or the release component 127 may be maintained and/or sold separately from the panel-side and substrate-side adhesive components 121, 124 and coupled thereto by the consumer prior to installation. In an embodiment whereby the panel-side and substrate-side adhesive components 121, 124 are maintained separate from one another prior to their being used to couple the panel 110 to the substrate 140, the release component 127 is coupled to one of the panel-side and substrate-side adhesive components 121, 124 such that when the panel 110 is coupled to the substrate 140 using the adhesive tape 120, the release component 127 is positioned between the panel-side adhesive component 121 and the substrate-side adhesive component 124. Thus, the release component 127 is illustrated coupled to the panel-side adhesive component 121 in FIG. 4, but it may just as readily be coupled to the substrate-side adhesive component 124 in other embodiments.

When it is desired to couple the panel 110 to the substrate 140 using the adhesive tape 120 as shown in FIG. 4, the panel-side adhesive component 121 is coupled to the panel 110 and the substrate-side adhesive component 124 is coupled to the substrate 140. Next, the panel 110 is attached to the substrate 140 by aligning the panel-side adhesive component 121 with the substrate-side adhesive component 124 and moving the panel 110 towards the substrate 140 until the panel-side and substrate-side adhesive components 121, 124 collectively hold the panel 110 on the substrate 140. More specifically, the panel 110 is moved towards the substrate 140 until the release component 127 is disposed between the panel-side adhesive component 121 and the substrate-side adhesive component 124. Thus, in this embodiment the panel-side and substrate-side adhesive components 121, 124 are connected (indirectly because the release component 127 is located between the panel-side and substrate-side adhesive components 121, 124) to mount or couple the panel 110 to the substrate 140. In the embodiments of FIGS. 1-4, the release component 127 may simply be a release coating without a carrier layer, or it may comprise multiple layers (specific examples of which are provided below).

FIGS. 5-19 illustrate several modification and variations for the panel-side adhesive component 121, the substrate-side adhesive component 124, and/or the release component 127. For all of these embodiments, the description set forth above with regard to FIGS. 1-4 is applicable. Specifically, the description and examples of adhesives, release coatings, carrier layers, panels, and substrates are applicable to the embodiments described below. Some of these figures may include reference numerals that are not described with regard to that particular figure. In such instances, the description of the feature having that same reference numeral has been provided for an earlier described embodiment and that earlier description is applicable.

Furthermore, in FIGS. 5-19, the adhesive tape 120 may be an integral structure including all of the various layers of the panel-side adhesive component 121, the substrate-side adhesive component 124, and the release component 127. The adhesive tape 120 may be applied to the panel 110 first and then the panel 110 coupled to the substrate 140 or the adhesive tape 120 may be applied to the substrate 140 first and then the panel 110 coupled to the substrate 140. Alternatively, the adhesive tape 120 may comprise separate components that are attached to one another during installation of the panel 110 on the substrate 140 such that the panel-side adhesive component 121 is attached to the panel 110, the substrate-side adhesive component 124 is attached to the substrate 140, and then the two are attached together (with the adhesive component 127 being disposed between the panel-side and substrate-side adhesive components 121, 124).

Although described herein as being a separate component, in some embodiments the release component 127 attached to one of the panel-side adhesive component 121 or the substrate-side adhesive component 124 during manufacture. Thus, the release component 127 may be a sub-component or sub-layer(s) of one of the panel-side or substrate-side adhesive components 121, 124. In such an embodiment, if the panel-side and substrate-side adhesive components 121, 124 are maintained separately (rather than being part of a unitary laminate structure), the release component 127 would form part of the laminate structure of the one of the panel-side or substrate-side adhesive components 121, 124 to which it is attached.

Figure 5:
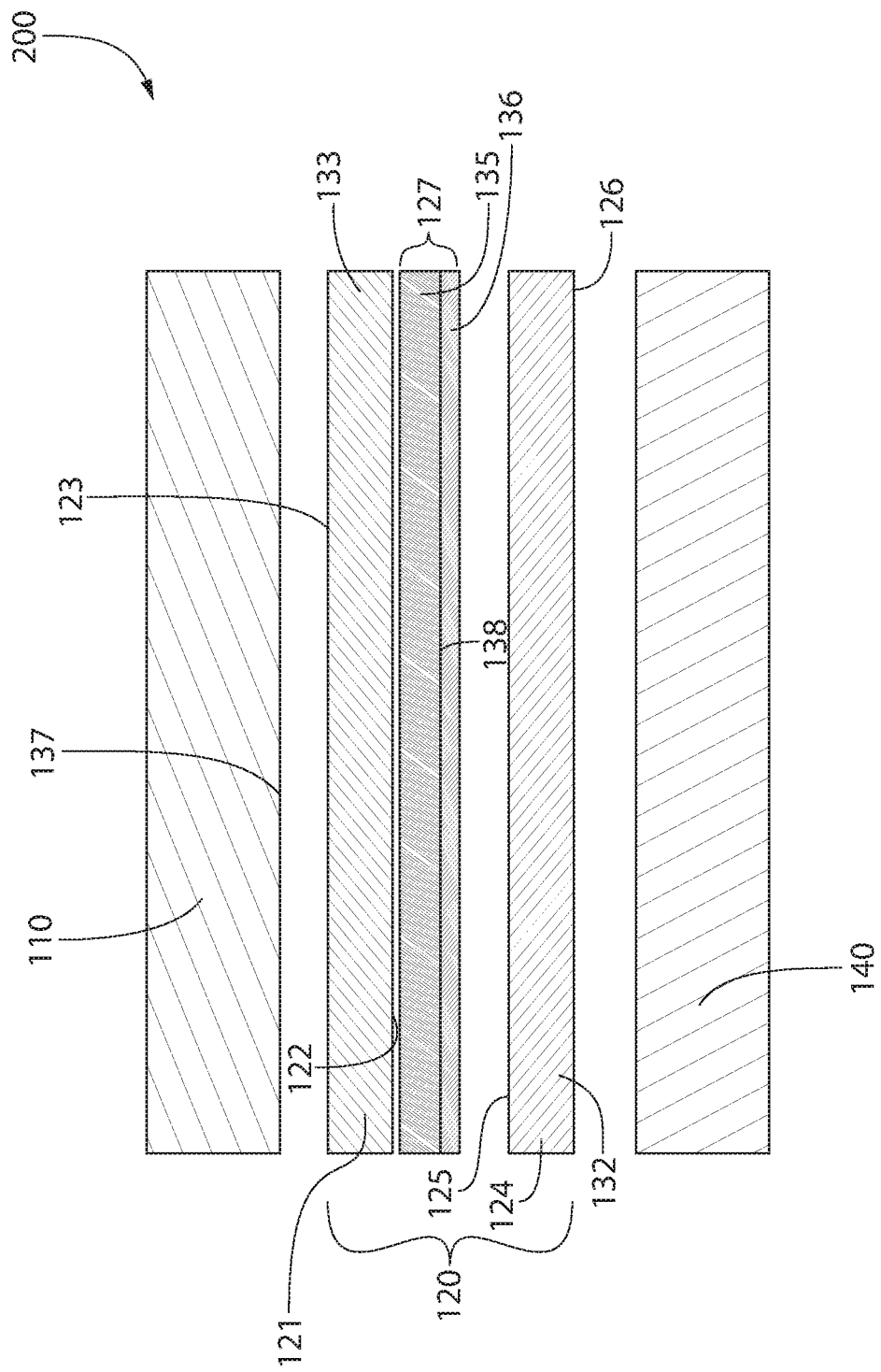
FIG. 5 is a schematic view of a surface covering system in accordance with a first alternative embodiment of the present invention.

Referring to FIG. 5, a surface mounting system 200 is illustrated in accordance with an alternative embodiment of the present invention. In this embodiment, the panel 110 and the substrate 140 are identical to that which has been described above and the previous disclosure of those components is applicable. The adhesive tape 120 comprises the panel-side adhesive component 121, the substrate-side adhesive component 124, and the release component 127 between the panel-side and substrate-side adhesive components 121, 124. In this embodiment, the substrate-side adhesive component 124 comprises one adhesive layer 132. Both of the first and second surfaces 125, 126 of the substrate-side adhesive component 124 are formed by the adhesive layer and comprise an adhesive material. Similarly, the panel-side adhesive component 121 in this embodiment comprises one adhesive layer 133. Both of the first and second surfaces 122, 123 of the panel-side adhesive component 121 are formed by the adhesive layer 133 and comprise an adhesive material.

The difference between the system 200 and the system 100 is that the release component 127 comprises a carrier layer 135 and a release coating 136. The carrier layer 135 has a first surface 137 and a second surface 138 opposite the first surface 137. In this embodiment, the release coating 136 is located on the second surface 138 of the carrier layer 135 and the first surface 137 of the carrier layer 135 is free of a release coating. When fully assembled, the first surface 122 of the panel-side adhesive component 121 is adhered to the first surface 137 of the carrier layer 135 of the release component 127 and the first surface 125 of the substrate-side adhesive component 124 is adhered to the release coating 136. The bond strength between the substrate-side adhesive component 124 and the release coating 136 is less than: (1) the bond strength between the panel-side adhesive component 121 and the carrier layer 135; (2) the bond strength between the panel-side adhesive component 121 and the panel 110; and (3) the bond strength between the substrate-side adhesive component 124 and the substrate 140. Thus, if after installation a user applies a removal force to the panel 110 to separate it from the substrate 140, the adhesive tape 120 will separate at the interface between the substrate-side adhesive component 124 and the release coating 136. After such separation, the panel-side adhesive component 121 will remain coupled to the panel 110 and the substrate-side adhesive component 124 will remain coupled to the substrate 140, although as described below they may later be removed therefrom, preferably without damaging the panel 110 and the substrate 140. It should be appreciated that the release component 127 could be flipped (i.e., rotated 180°) so that the carrier layer 135 is adhered to the substrate-side adhesive component 124 and the release coating 136 is adhered to the panel-side adhesive component 121.

Figure 6:
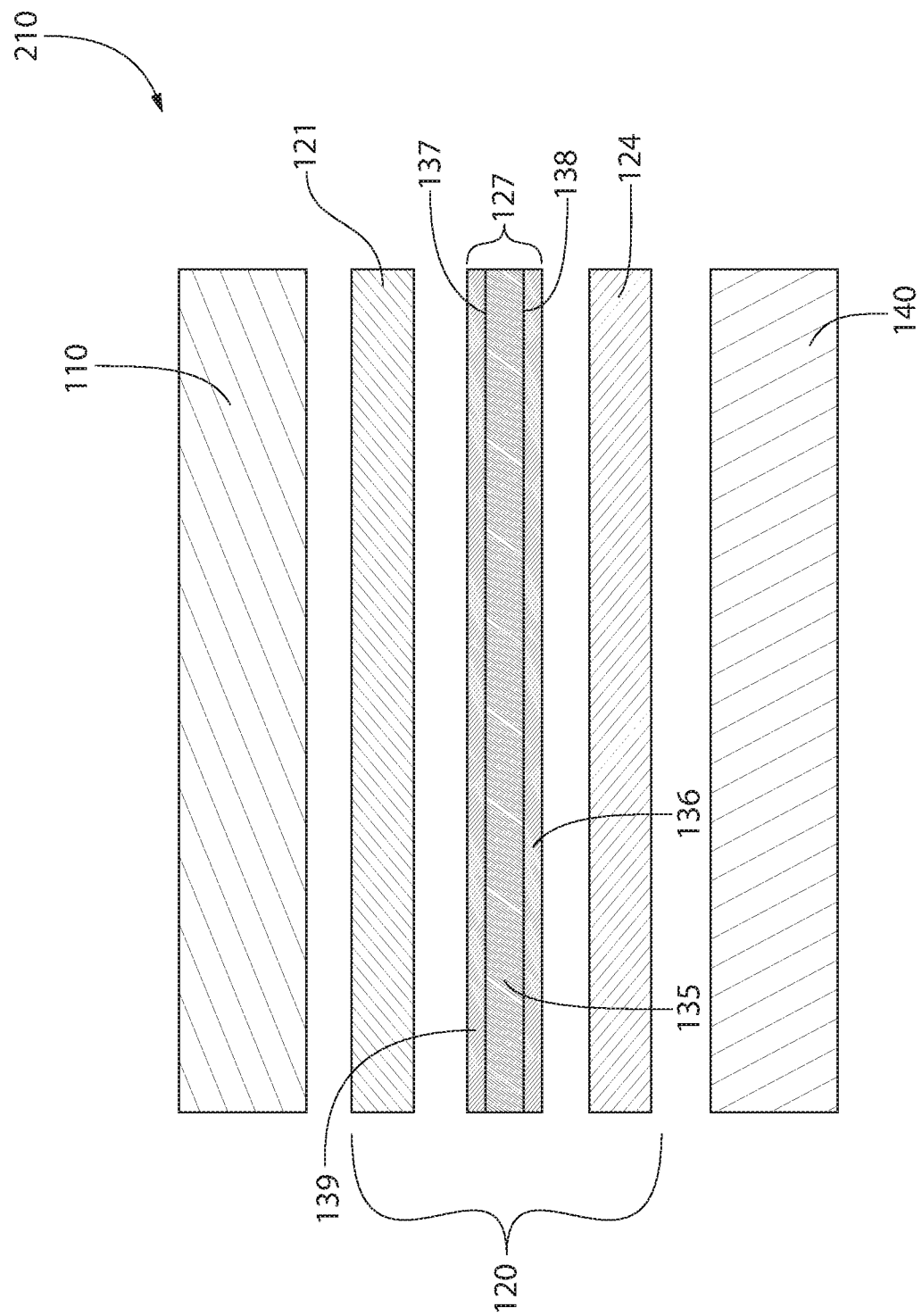
FIG. 6 is a schematic view of a surface covering system in accordance with a second alternative embodiment of the present invention.

Referring to FIG. 6, a surface covering system 210 is illustrated in accordance with another embodiment of the present invention. The system 210 is very similar to the system 200 of FIG. 5, and thus only the differences between these two systems will be described below, it being understood that the description of the system 200 is otherwise applicable. The system 210 generally comprises the panel 110, the substrate 140, and the adhesive tape 120. The adhesive tape 120 comprises the panel-side adhesive component 121, which in this embodiment comprises the adhesive layer 133, a substrate-side adhesive component 124, which in this embodiment comprises the adhesive layer 132, and a release component 127. The difference in this embodiment is in the structure of the release component 127. Specifically, in this embodiment the release component 127 comprises a carrier layer 135 having a first surface 137 and a second surface 138, a first release coating 139 on the first surface 137 and a second release coating 136 on the second surface 138. Thus, both opposing surfaces of the carrier layer 135 are covered with a release coating 136, 139.

Thus, in this embodiment when the panel 110 is coupled to the substrate 140 using the adhesive tape 120, the adhesive tape 120 may separate at one of two locations when a user applies a removal force onto the panel 110. Specifically, the adhesive tape 120 may separate at the interface of the panel-side adhesive component 121 and the first release coating 139 or the adhesive tape 120 may separate at the interface of the substrate-side adhesive component 124 and the second release coating 136. This is due to those interfaces having a reduced bond strength relative to the other interfaces between the various layers of the adhesive tape 120.

Figure 7:
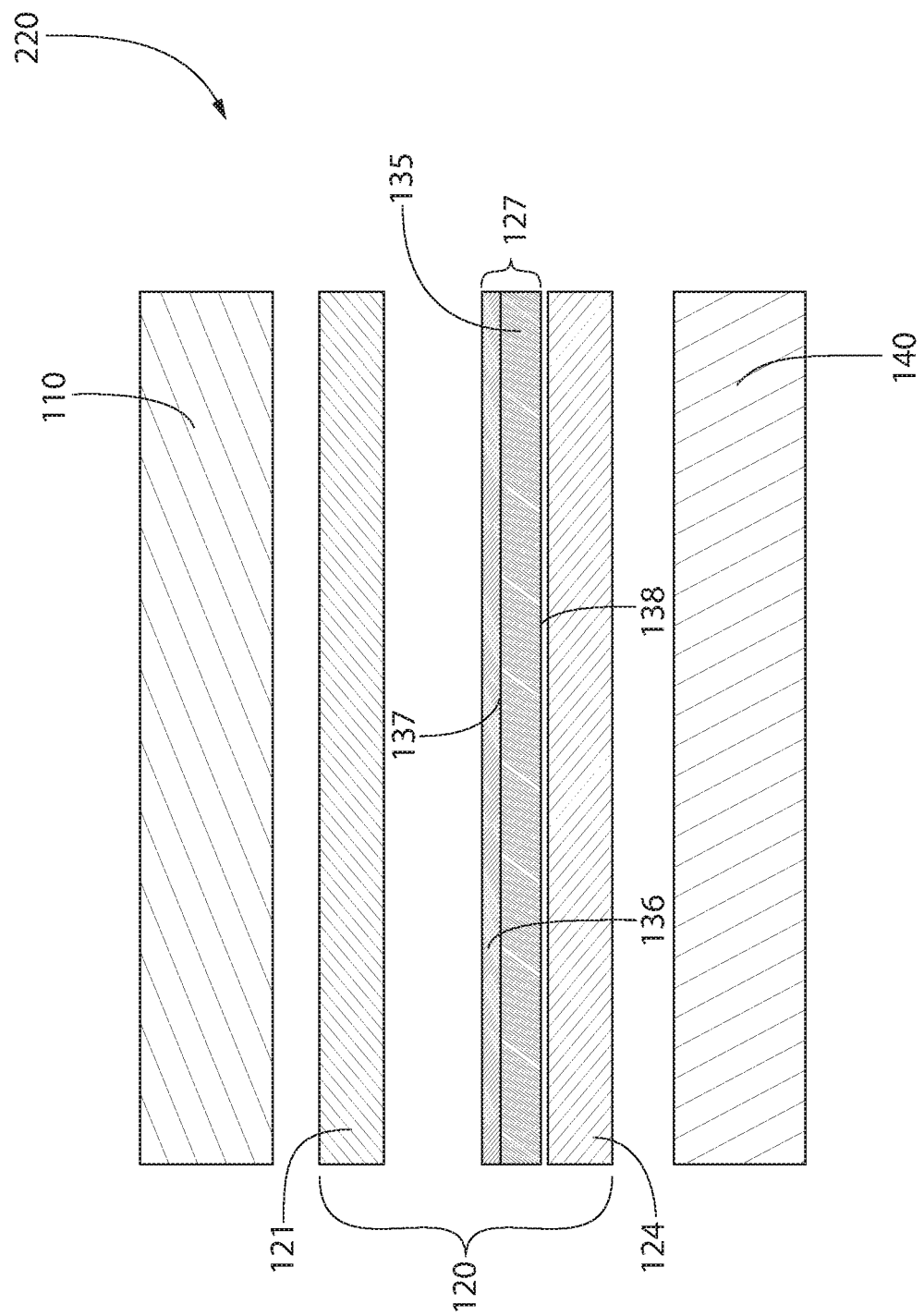
FIG. 7 is a schematic view of a surface covering system in accordance with a third alternative embodiment of the present invention.

FIG. 7 illustrates a surface covering system 220 in accordance with another embodiment of the present invention. FIG. 7 is identical to FIG. 5 except for the following. In this embodiment, the release coating 136 is positioned on the first surface 137 of the carrier layer 135 rather than on the second surface 138 of the carrier layer 135 as with FIG. 5. As a result, the substrate-side adhesive component 124 is adhered to the second surface 138 of the carrier layer 135 and the panel-side adhesive component 121 is adhered to the release coating 136 when the adhesive tape 120 is assembled as has been described herein.

Figure 8:
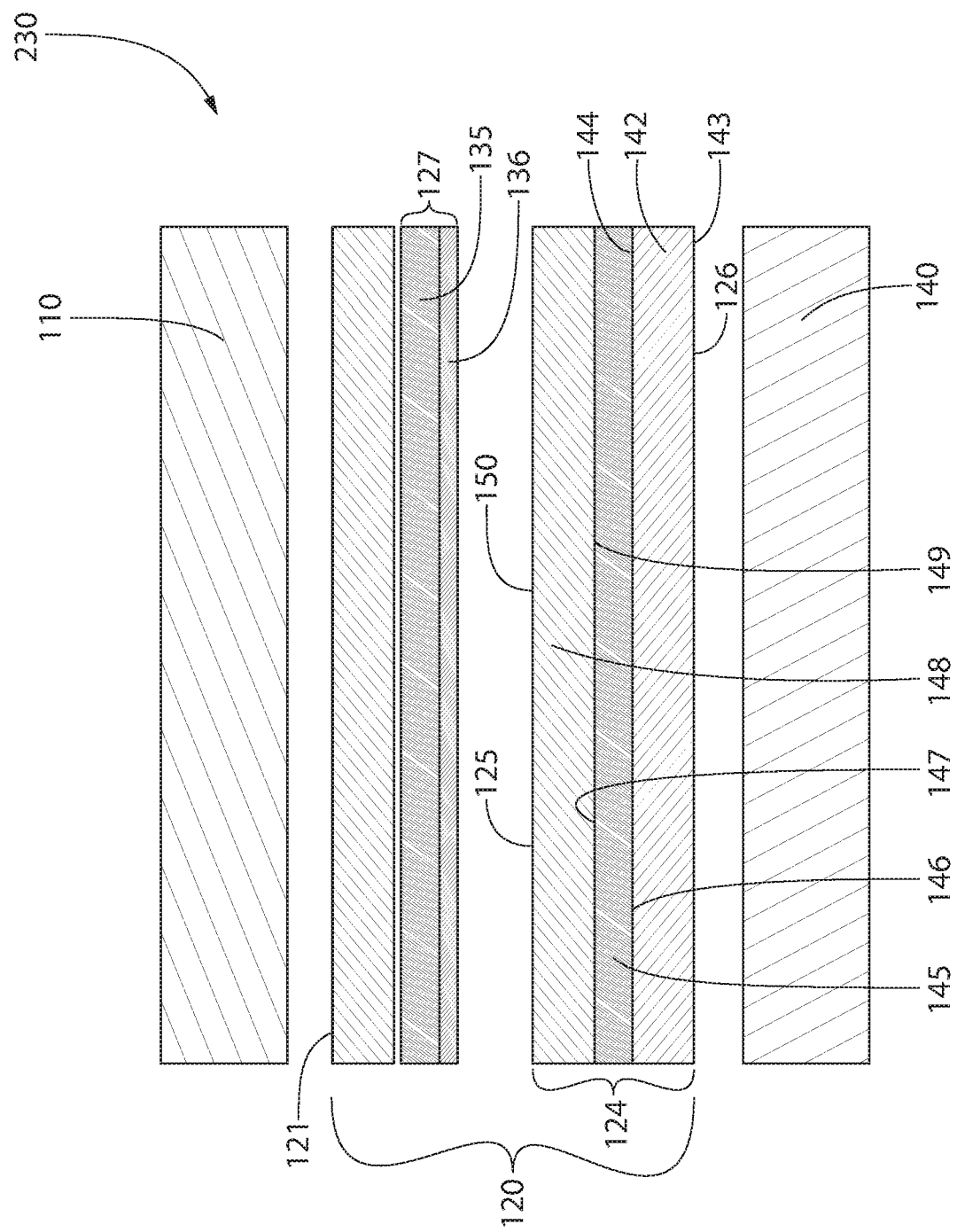
FIG. 8 is a schematic view of a surface covering system in accordance with a fourth alternative embodiment of the present invention.

FIG. 8 illustrates a surface covering system 230 in accordance with another embodiment of the present invention. In this embodiment, the panel-side adhesive component 121 comprises one adhesive layer 133 and the release component 127 comprises a carrier layer 135 and a release coating 136 similar to that which has been described above with regard to FIG. 5. The difference in this embodiment is with regards to the structure of the substrate-side adhesive component 124. Specifically, the substrate-side adhesive component 124 comprises a first adhesive layer 142 having a first surface 143 and a second surface 144 opposite the first surface 143, a carrier layer 145 having a first surface 146 and a second surface 147 opposite the first surface 146, and a second adhesive layer 148 having a first surface 149 and a second surface 150 opposite the first surface 149

In this embodiment, the second surface 150 of the second adhesive layer 148 forms the first surface 125 of the substrate-side adhesive component 124 and the first surface 143 of the first adhesive layer 142 forms the second surface 126 of the substrate-side adhesive component 124. Thus, when the substrate-side adhesive component 124 is adhered to the substrate 140, the second surface 150 of the second adhesive layer 148 is adhered to the release component 127 and the first surface 143 of the first adhesive layer 142 is adhered to the substrate 140. The first and second surfaces 143, 144 of the first adhesive layer 142 and the first and second surfaces 149, 150 of the second adhesive layer 148 all comprise an adhesive material so that those surfaces are adhesive or tacky to facilitate the coupling of the substrate-side adhesive component 124 to the substrate 140 and to the release component 127 as described herein.

Although in the embodiment of FIG. 8 the release component 127 is illustrated such that the carrier layer 135 thereof is attached to the panel-side adhesive component 121, the invention is not to be so limited and the release component 127 could be flipped (i.e., rotated 180°) so that the carrier layer 135 is adhered to the substrate-side adhesive component 121. Either way, the release component 127 is located between the panel-side adhesive component 121 and the substrate-side adhesive component 124 when the adhesive tape 120 is fully assembled.

Figure 9:
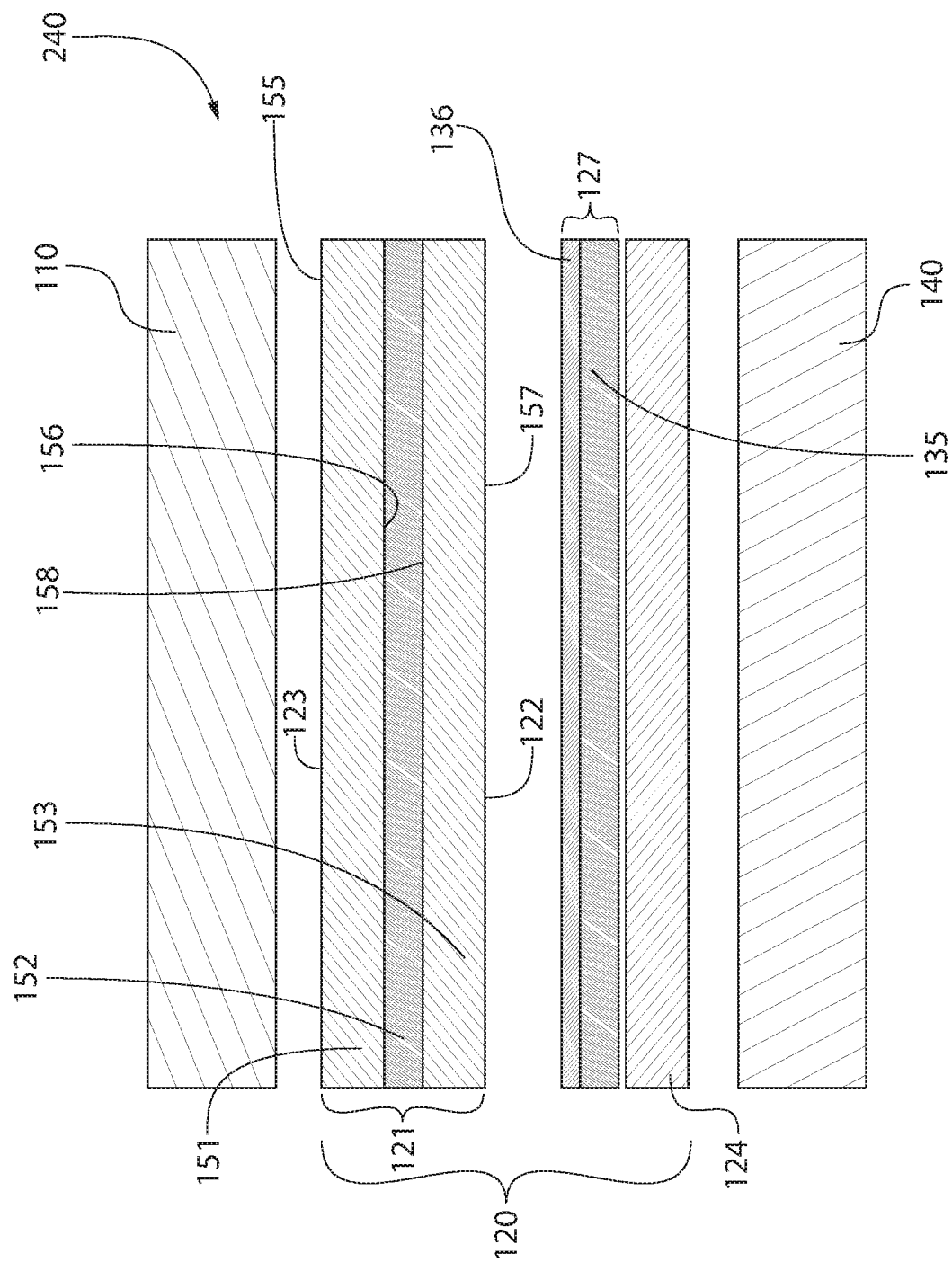
FIG. 9 is a schematic view of a surface covering system in accordance with a fifth alternative embodiment of the present invention.

Referring to FIG. 9, a surface covering system 240 is illustrated in accordance with another embodiment of the present invention. The surface covering system 240 is essentially the reverse of the surface covering system 230 because in the surface covering system 240 the panel-side adhesive component 121 comprises multiple layers and the substrate-side adhesive component 124 comprises a single adhesive layer. Specifically, in this embodiment the panel-side adhesive component 121 comprises a first adhesive layer 151, a carrier layer 152, and a second adhesive layer 153 and the substrate-side adhesive component 121 comprises a single adhesive layer 154. Furthermore, the release component 127 comprises a carrier layer 135 and a release coating 136 as described above with reference to FIG. 5.

The first adhesive layer 151 comprises a first surface 155 that forms the second surface 123 of the panel-side adhesive component 121 and an opposite second surface 156. Furthermore, the second adhesive layer 153 comprises a first surface 157 that forms the first surface 122 of the panel-side adhesive component 121 and an opposite second surface 158. The first and second surfaces 155, 156 of the first adhesive layer 151 and the first and second surfaces 157, 158 of the second adhesive layer 157 all comprise an adhesive or tacky material to facilitate the coupling together of the various layers of the adhesive tape 120 as has been described thoroughly above.

Figure 10:
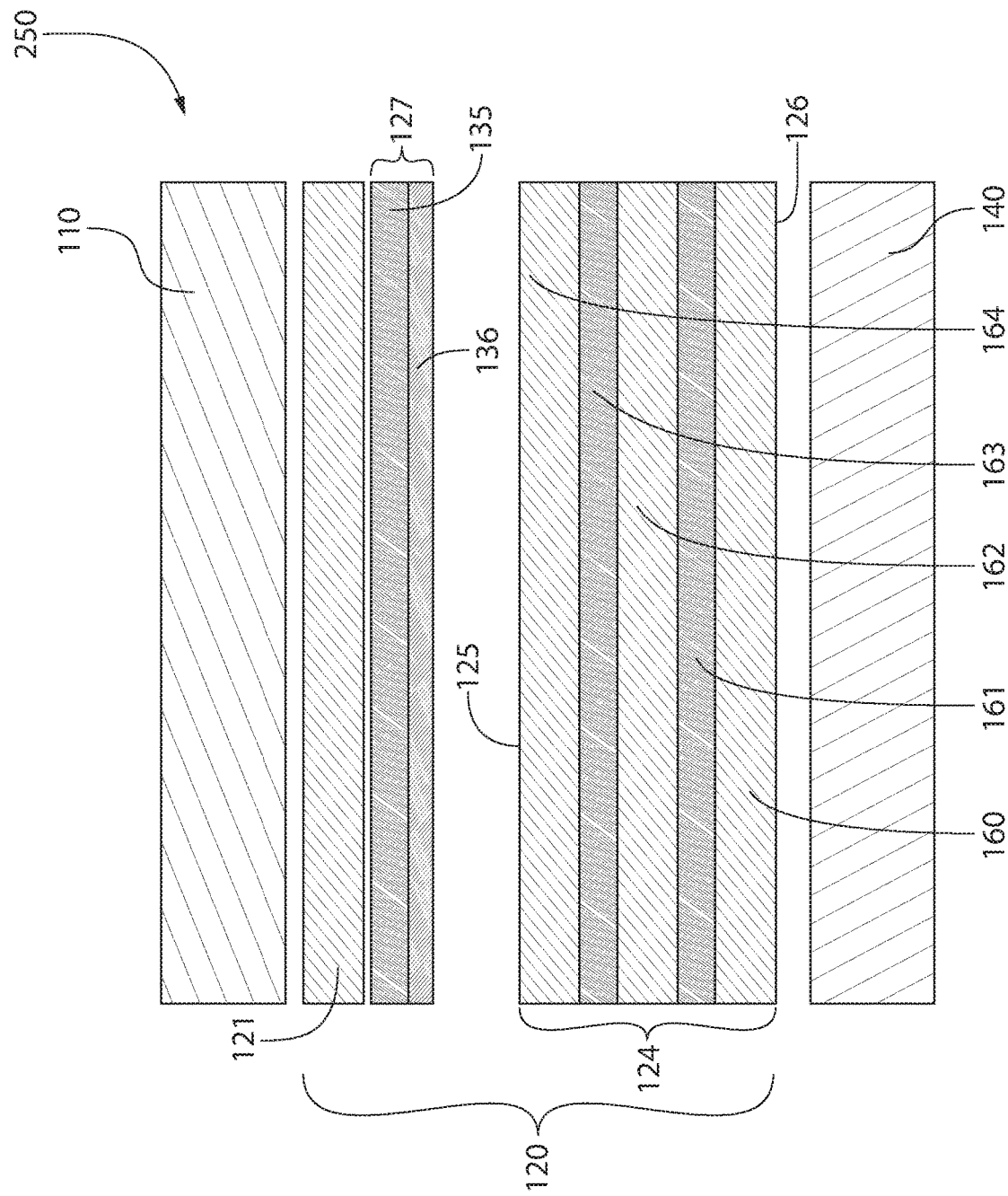
FIG. 10 is a schematic view of a surface covering system in accordance with a sixth alternative embodiment of the present invention.

Referring to FIG. 10, yet another embodiment of a surface covering system 250 is illustrated. In this embodiment, the panel-side adhesive component 121 comprises a single adhesive layer 159 and the release component 127 comprises the carrier layer 135 and the release coating 136. The main difference in this embodiment is with regards to the structure of the substrate-side adhesive component 124, which comprises a first adhesive layer 160, a first carrier layer 161, a second adhesive layer 162, a second carrier layer 163, and a third adhesive layer 164. Thus, this embodiment merely adds multiple adhesive layers such that adjacent ones of the adhesive layers are separated by a carrier layer. This can increase handling strength, cushioning, holding power, and the like.

In the embodiment of FIG. 10, the various adhesive layers 160, 162, 164 may have different adhesive strengths to further facilitate the internal separation of the adhesive tape 120. For example, the first adhesive layer 160 may have a first adhesive strength, the second adhesive layer 162 may have a second adhesive strength, and the third adhesive layer 164 may have a third adhesive strength. It may be preferable in some embodiments for the first adhesive strength of the first adhesive layer 160 to be greater than the second adhesive strength of the second adhesive layer 162 and/or greater than the third adhesive strength of the third adhesive layer 164. In some embodiments, the first adhesive strength is greater than the second adhesive strength and the second adhesive strength is greater than the third adhesive strength.

In some embodiments, the adhesive strength (or bonding strength) of the first adhesive layer 160 to the first carrier layer 161 should be greater than the adhesive strength (or bonding strength) of the first adhesive layer 160 to the substrate 140. Thus, during the removal process of adhesive tape 120, the first adhesive layer 160 will stay attached to the first carrier layer 161 and leave the substrate 140 clean. In such an embodiment, the adhesive strength or bonding strength of the first adhesive layer 160 to the substrate 140 should be lower than the integral strengths of the substrate 140, such as the force required to peel, tear, pull or cause other damage to the substrate 140. Thus, although the first adhesive layer 160 is removed from the substrate 140 during the removal of the panel 110, it will not damage the substrate 140. This may be applicable to all other embodiments of the present invention.

This variation in adhesive strengths will cause the adhesive tape 120 to separate at the interface of the third adhesive layer 164 and the release component 127 or at the interface of the third adhesive layer 164 and the second carrier layer 163, or at the interface of the second adhesive layer 162 and either the first or second carrier layers 161, 163, or the separation of adhesive layer 160 and the substrate 140 before causing tearing or other damages to the substrate 140. In some embodiments, it is desired for the adhesive layer 160 alone or with other adjacent layers to remain adhered to the substrate 140 after the panel 110 is removed from the substrate 140. In such embodiments, a user can take a more precise approach when removing the first adhesive layer 160 alone or with other adjacent layers from the substrate 140 and can do so in a manner that reduces the likelihood that the substrate 140 will be damaged in the process. In other embodiments the adhesive layer 160 may separate from the substrate 140 when the panel 110 is removed from the substrate 140 without causing damage to the substrate 140, as discussed above.

In this embodiment, the release component 127 is illustrated with the carrier layer 135 adjacent to the panel-side adhesive component 121, but the release component 127 could be flipped (i.e., rotated 180°) so that its carrier layer 135 is adjacent to the substrate-side adhesive component 124. Furthermore, the release component 127 could include a release coating on both surfaces of the carrier layer 135 as with the embodiment of FIG. 6. In fact, many variations of the embodiments disclosed herein are possible by mixing the structural and layer details of any of the disclosed panel-side adhesive components 121, substrate-side adhesive components 124, and release components 127.

Figure 11:
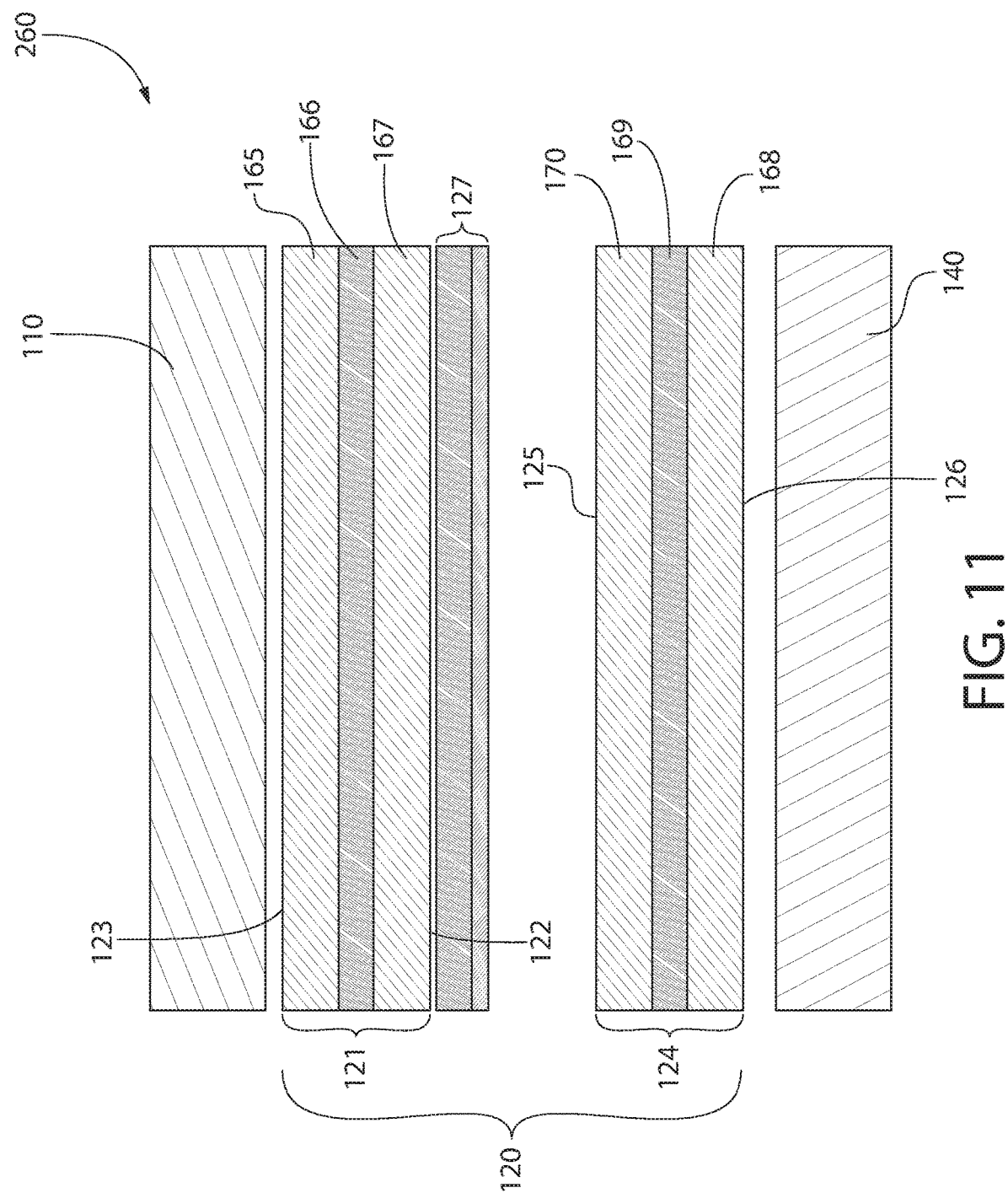
FIG. 11 is a schematic view of a surface covering system in accordance with a seventh alternative embodiment of the present invention.

Referring to FIG. 11, a surface covering system 260 is illustrated in accordance with yet another embodiment of the present invention. Again, in this embodiment the release component 127 comprises the carrier layer 135 and the release coating 136, although the carrier layer 135 could be omitted (as it could in all embodiments in which it is shown) or there could be release coatings on both surfaces of the carrier layer 135. Furthermore, in this embodiment the panel-side adhesive component 121 comprises a first adhesive layer 165, a first carrier layer 166, and a second adhesive layer 167. Similarly, the substrate-side adhesive component 124 comprises a first adhesive layer 168, a first carrier layer 169, and a second adhesive layer 170. Thus, this embodiment merely exemplifies that both the panel-side and substrate-side adhesive components 121, 124 may comprise multiple adhesive layers that are separated by carrier layers. The adhesive strengths of the various adhesive layers may be the same or different as has been noted herein above. It is desired the adhesive strength of adhesive layer 168 to the carrier layer 169 is greater than its adhesive strength to substrate 140 surface, as the carrier layer can provide additional strength during removal of adhesive 168 layer from the substrate 140 surface.

Figure 12:
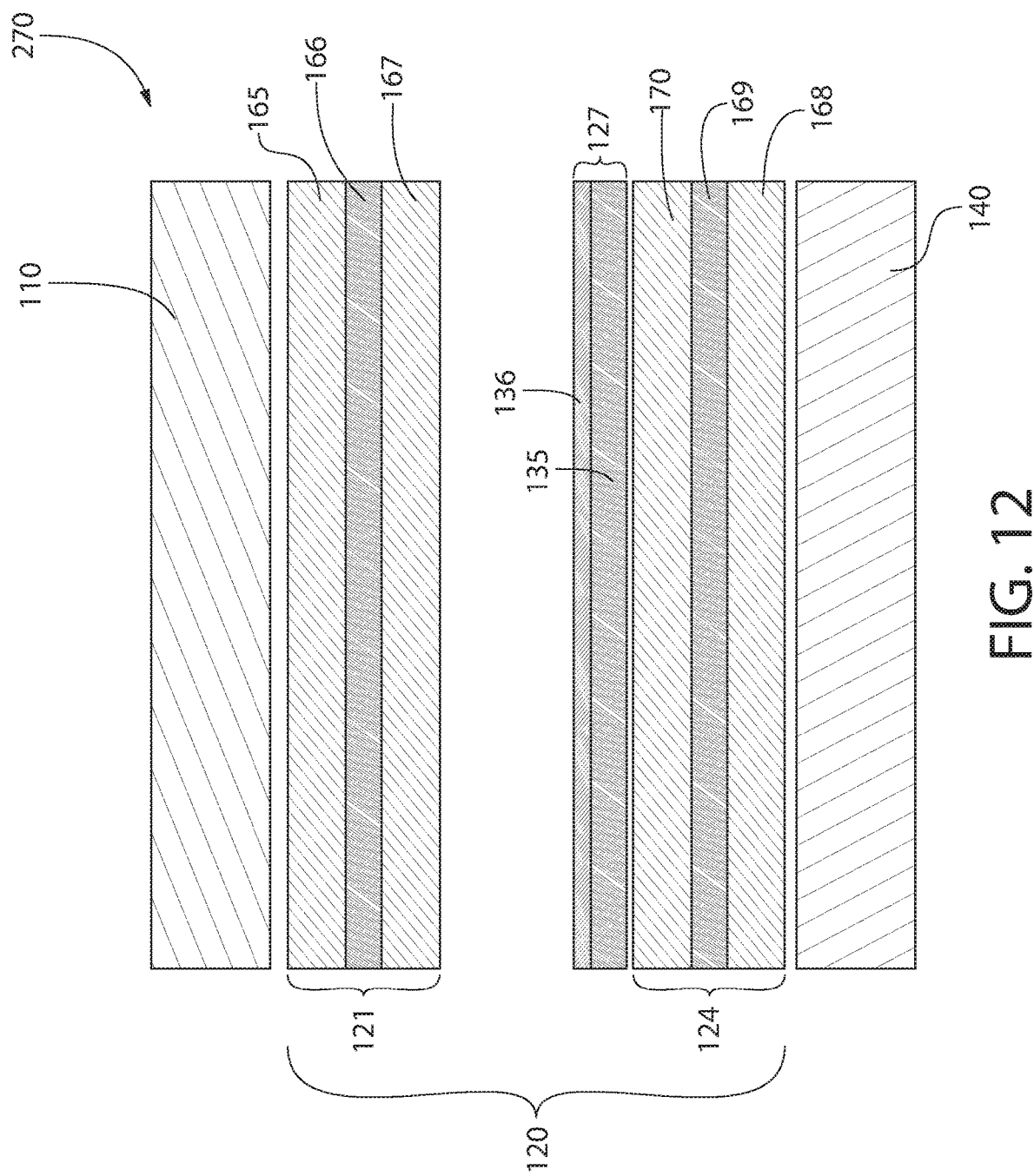
FIG. 12 is a schematic view of a surface covering system in accordance with an eighth alternative embodiment of the present invention.

Referring to FIG. 12, a surface covering system 270 is illustrated in accordance with still another embodiment of the present invention. The surface covering system 270 of FIG. 12 is identical to the surface covering system 260 of FIG. 11 except that the release component 127 has been flipped (i.e., rotated 180°) so that the carrier layer 135 of the release component 127 is adhered to the substrate-side adhesive component 124 rather than to the panel-side adhesive component 121 as with the surface covering system 260. The details of the surface covering system 270 are self-explanatory based on the description set forth above with regard to the previously disclosed embodiments.

Figure 13:
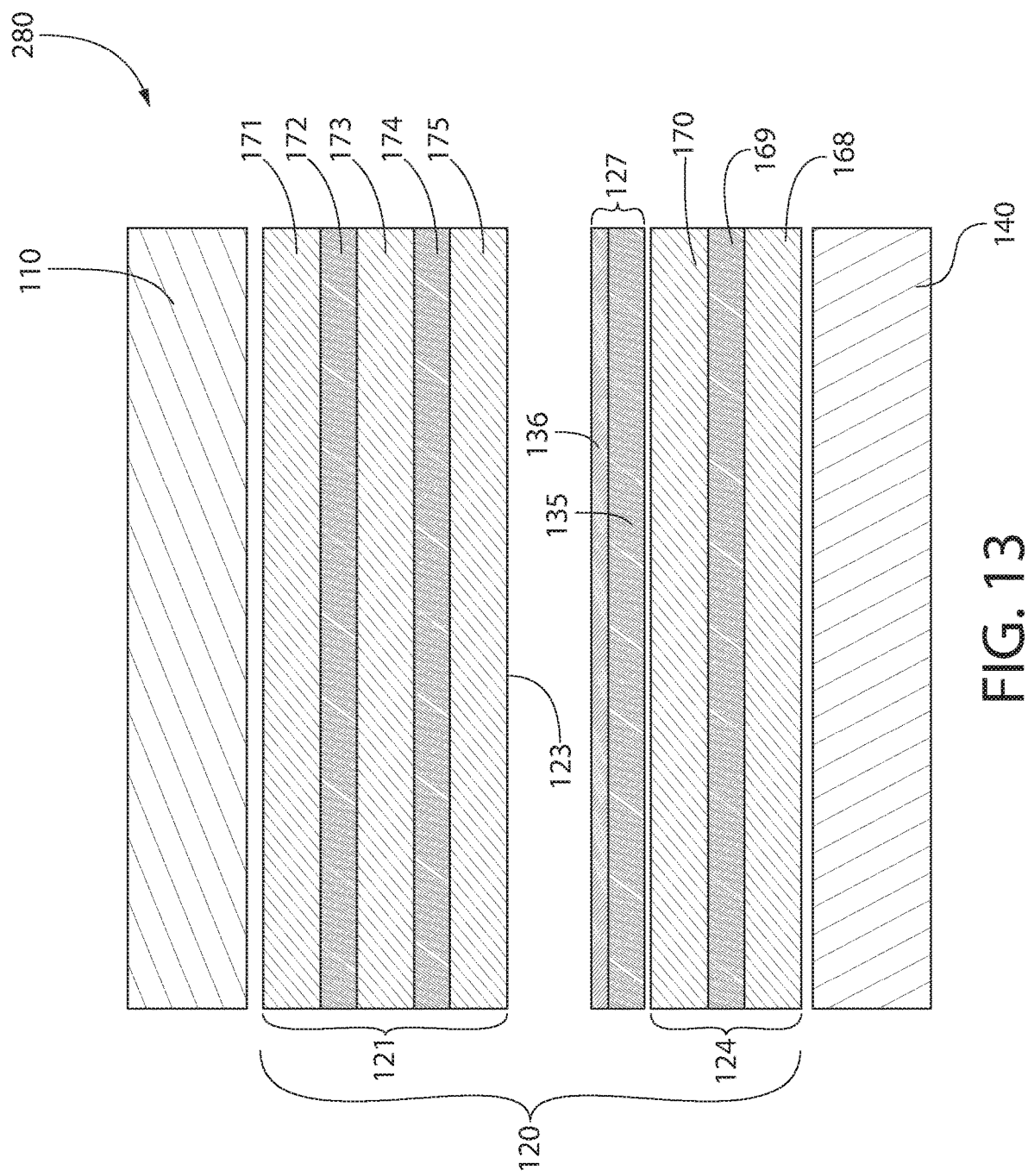
FIG. 13 is a schematic view of a surface covering system in accordance with a ninth alternative embodiment of the present invention.

Referring to FIG. 13, yet another embodiment of a surface covering system 280 is illustrated in accordance with the present invention. In this embodiment, the layered structure of the substrate-side adhesive component 124 and the release component 127 is the same as that which was shown and described in FIGS. 11 and 12. However, in this embodiment the panel-side adhesive component 121 comprises a first adhesive layer 171, a first carrier layer 172, a second adhesive layer 173, a second carrier layer 174, and a third adhesive layer 175. The third adhesive layer 175 forms the first surface 122 of the panel-side adhesive component 121 and the first adhesive layer 171 forms the second surface 123 of the panel-side adhesive component 121.

Figure 14:
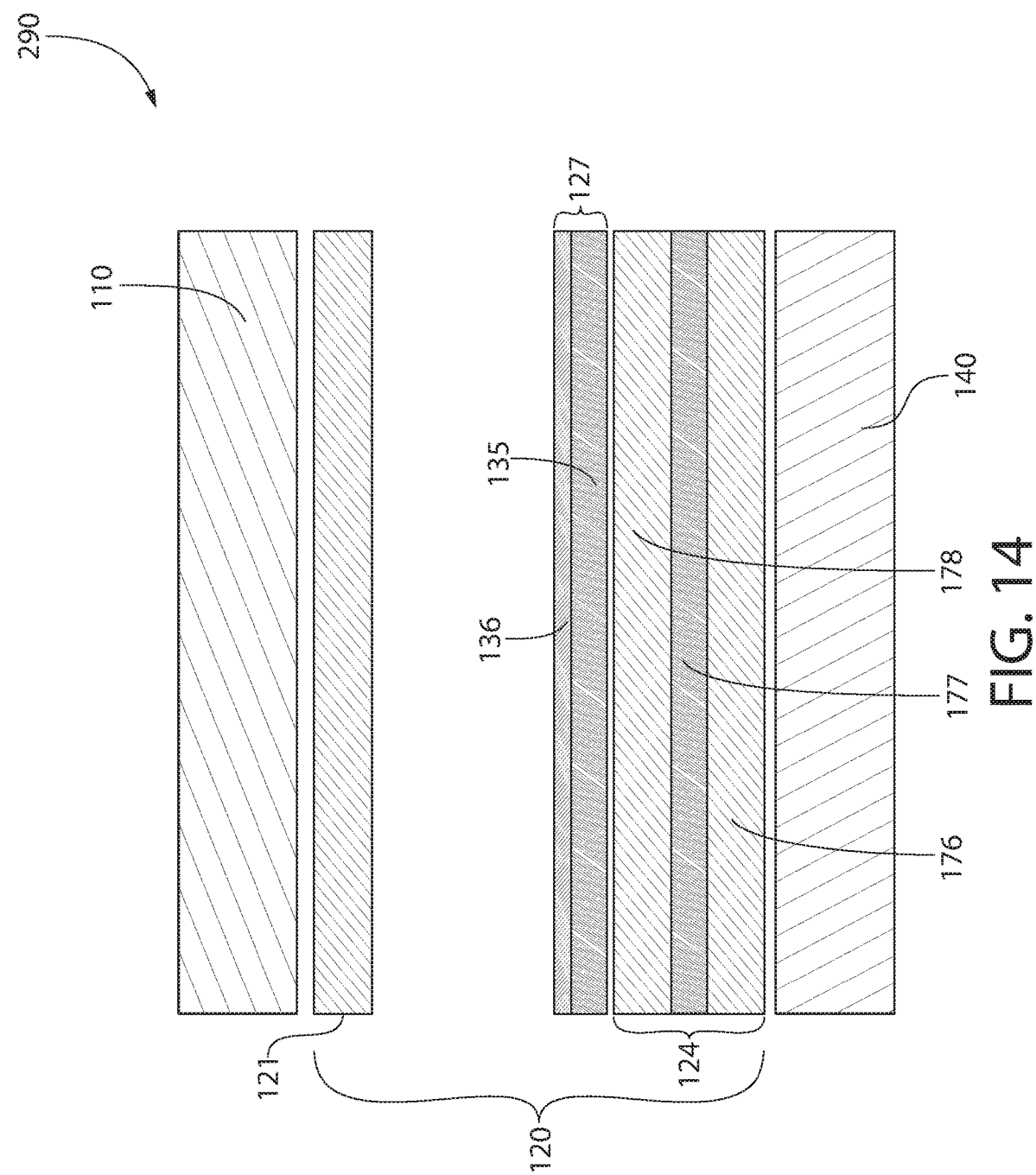
FIG. 14 is a schematic view of a surface covering system in accordance with a tenth alternative embodiment of the present invention.
Figure 15:
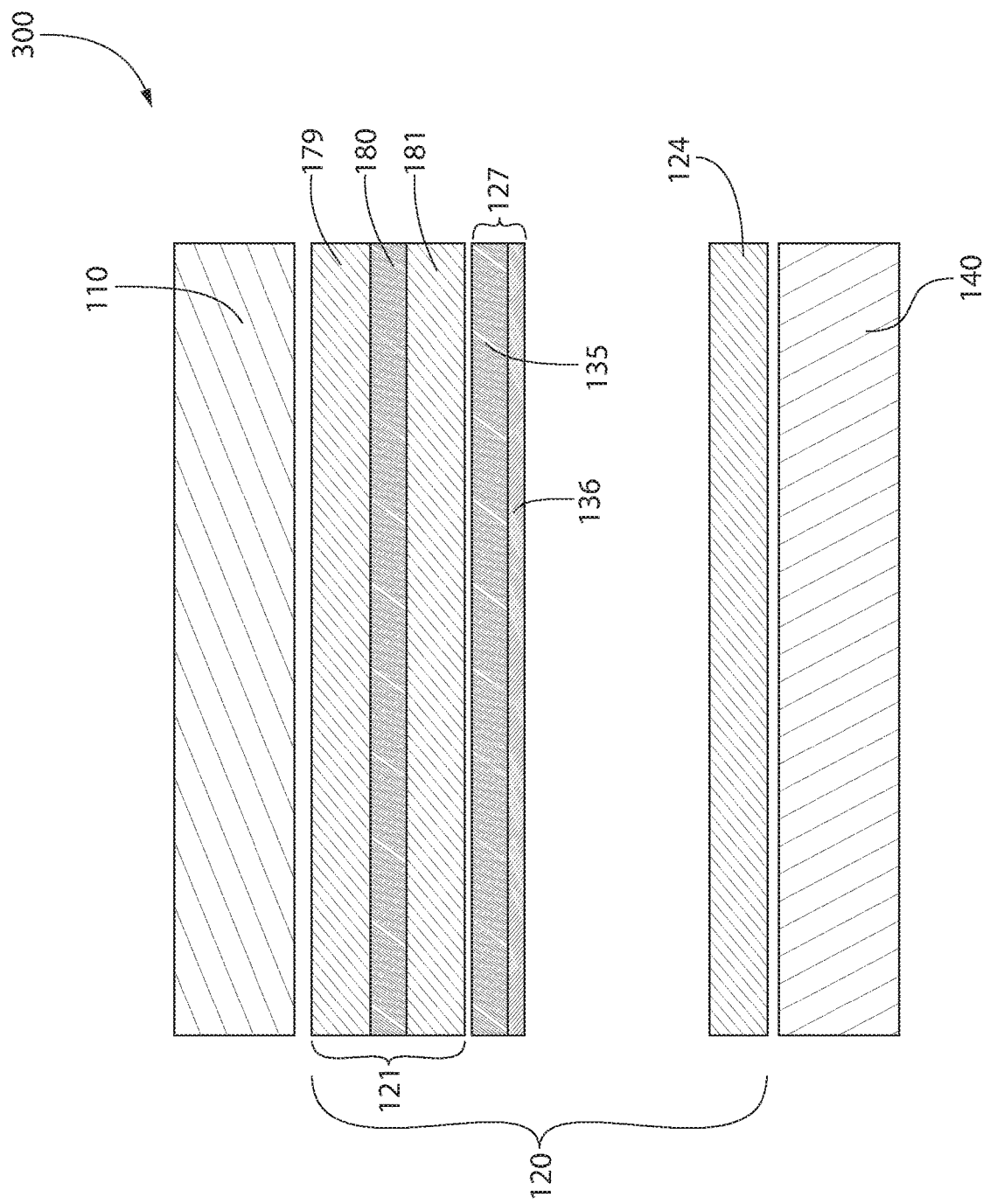
FIG. 15 is a schematic view of a surface covering system in accordance with an eleventh alternative embodiment of the present invention.

FIGS. 14 and 15 illustrate still additional embodiments. FIG. 14 illustrates a surface covering system 290 that includes the panel-side adhesive component 121 having a single adhesive layer, the substrate-side adhesive component 124 having a first adhesive layer 176, a carrier layer 177 and a second adhesive layer 178, and the release component 127 comprising the carrier layer 135 and the release coating 136. In this embodiment, the release component 127 is adhered to the substrate-side adhesive component 124 prior to installation of the panel 110 on the substrate 140. Of course, the release component 127 could be adhered to the panel-side adhesive component 121 prior to panel 110 installation in alternative embodiments.

FIG. 15 illustrates a surface covering system 300 that is similar to the surface covering system 290 of FIG. 14 except that the panel-side adhesive component 121 is a multi-layered structure and the substrate-side adhesive component 124 is a single layer structure. Specifically, the panel-side adhesive component 121 in this embodiment comprises a first adhesive layer 179, a carrier layer 180, and a second adhesive layer 181. Furthermore, in surface covering system 300 the release component 127 is adhered to the panel-side adhesive component 121 prior to installation of the panel 110 on the substrate 140. Of course, the release component 127 could be adhered to the substrate-side adhesive component 124 prior to panel 110 installation in alternative embodiments.

Figure 16:
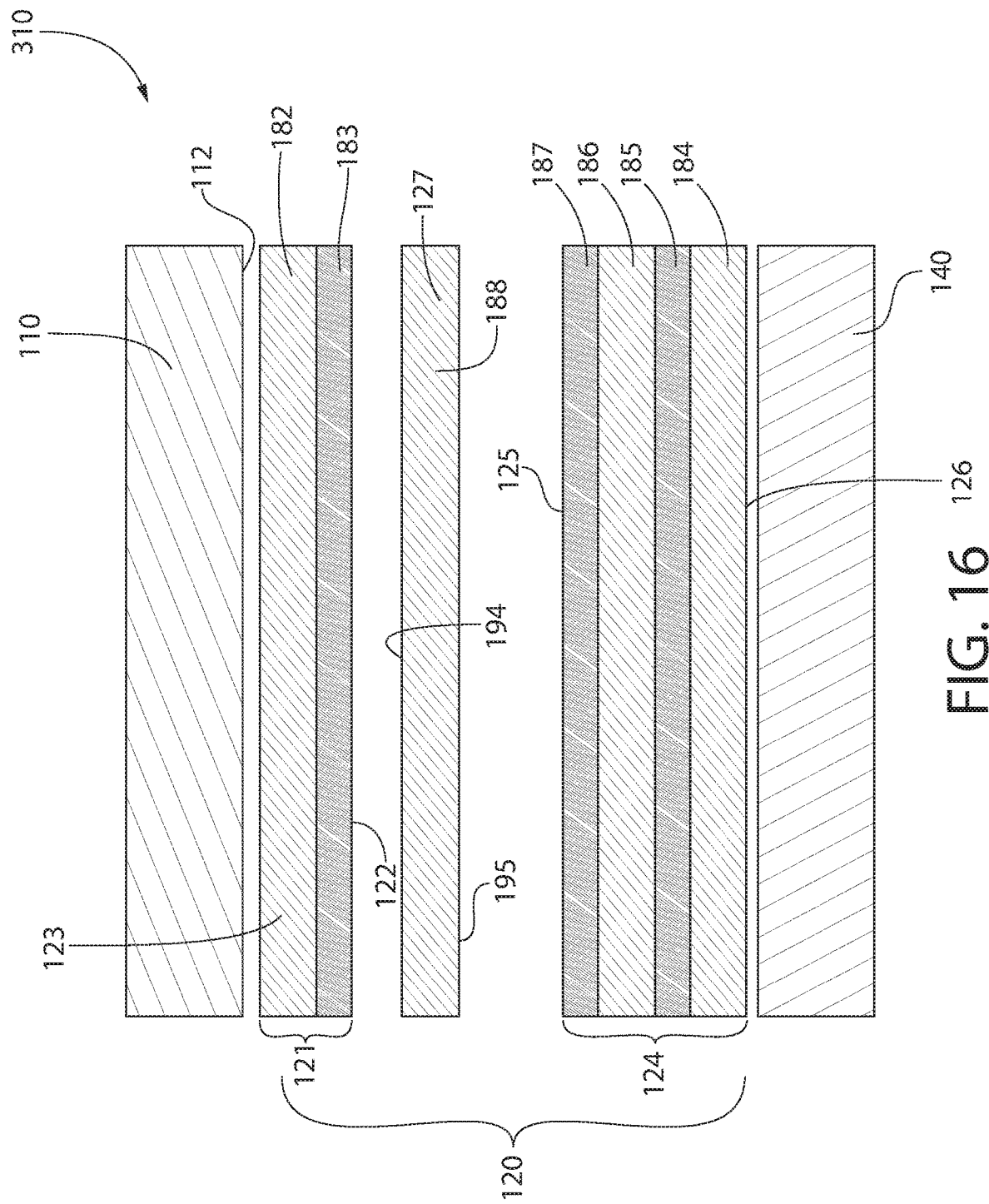
FIG. 16 is a schematic view of a surface covering system in accordance with a twelfth alternative embodiment of the present invention.

FIG. 16 illustrates a surface covering system 310 in accordance with yet another embodiment of the present invention. In this embodiment, the panel-side adhesive component 121 comprises an adhesive layer 182 and a carrier layer 183. Of course, in other embodiments additional adhesive layers and carrier layers could be added to the panel-side adhesive component. However, as a modification to all of the previously described embodiments, in this embodiment it is preferable that a carrier layer form the first surface 122 of the panel-side adhesive component 121. Thus, the first surface 122 of the panel-side adhesive component 121 is not formed of an adhesive material and is thus not adhesive. The adhesive layer 182 forms the second surface 123 of the panel-side adhesive component 121 that is adhered to the rear surface 112 of the panel 110 when the panel 110 is installed on the substrate 140. The carrier layer 183 forms the first surface 122 of the panel-side adhesive component 121 that is coupled to the release component 127. This is in contrast to all of the embodiments described hereinbefore. Specifically, in all of the previously described embodiments the first and second surfaces 122, 123 of the panel-side adhesive component 121 were both formed from an adhesive layer so that the first and second surfaces 122, 123 were tacky or otherwise adhesive to facilitate coupling of the panel-side adhesive component 121 to the panel 110 and to the release component 127. This is not required, or even desirable, in the embodiment of the surface covering system 310 due to a modification to the structure of the release component 127, described more fully below. Thus, in this embodiment the first surface 122 of the panel-side adhesive component 121 is free of an adhesive material.

In this embodiment, the substrate-side adhesive component 124 comprises a first adhesive layer 184, a first carrier layer 185, a second adhesive layer 186, and a second carrier layer 187. Of course, the second adhesive and carrier layers 186, 187 could be omitted or additional pairs of adhesive and carrier layers could be added to the substrate-side adhesive component 124 in other embodiments. In the exemplified embodiment, the first adhesive layer 184 forms the second surface 126 of the substrate-side adhesive component 124 and the second carrier layer 187 forms the first surface 125 of the substrate-side adhesive component 124. Thus, similar to the panel-side adhesive component 121 of the surface covering system 310, the first surface 125 of the substrate-side adhesive component 124 which faces (and adheres to) the release component 127 is not formed from a tacky or otherwise adhesive material, but rather it is formed from a carrier layer that is devoid of an adhesive.

Furthermore, in this embodiment the release component 127 comprises at least one adhesive layer 188 having a first surface 194 and a second surface 195 opposite the first surface 194. In variations, the release component 127 could comprise multiple adhesive layers that are separated by a carrier layer so long as the first and second surfaces 194, 195 of the release component 127 are formed from one of the adhesive layers. Thus, each of the first and second surfaces 194, 195 of the adhesive layer 188 of the release component 127 are formed from or comprise an adhesive material so that those surfaces are adhesive. This is in contrast to all of the previously described embodiments whereby the release component 127 comprised one or more release coatings (i.e., silicone-based or non-silicone-based) with an optional carrier layer. The adhesive layer 188 of the release component 127 is positioned directly between the carrier layer 183 of the panel-side adhesive component 121 and the second carrier layer 187 of the substrate-side adhesive component. Specifically, when the adhesive tape 120 is fully assembled, the first surface 194 of the adhesive layer 188 of the release component 127 is adhered to the carrier layer 183 of the panel-side adhesive component 121 and the second surface 195 of the adhesive layer 188 of the release component 127 is adhered to the second carrier layer 187 of the substrate-side adhesive component 124.

In this embodiment, the adhesive layer 182 of the panel-side adhesive component 121 comprises a first adhesive strength, the first adhesive layer 184 of the substrate-side adhesive component 124 comprises a second adhesive strength, and the adhesive layer 188 of the release component 127 comprises a third adhesive strength. Furthermore, the third adhesive strength of the adhesive layer 188 of the release component 127 is less than at least one of the first adhesive strength of the adhesive layer 182 of the panel-side adhesive component 121 and the second adhesive strength of the first adhesive layer 184 of the substrate-side adhesive component 124. This allows for separation to occur at the adhesive layer 188 of the release component 127 rather than at the adhesive layer 182 of the panel-side adhesive component 121 or the first adhesive layer 184 of the substrate-side adhesive component 124 when the panel 110 is being removed from the substrate 140.

Stated another way, when the surface covering system 310 is fully assembled, the substrate-side-adhesive component 124 is coupled to the substrate 140 with a first bond strength, the panel-side adhesive component 121 is coupled to the panel 110 with a second bond strength, the substrate-side adhesive component 124 is coupled to the adhesive layer 188 of the release component 127 with a third bond strength, and the panel-side adhesive component 121 is coupled to the adhesive layer 188 of the release component 127 with a fourth bond strength. In some such embodiments, at least one of the third and fourth bond strengths is less than each of the first and second bond strengths. Again, this ensures that when the panel 110 is being pulled away from the substrate 140, the adhesive tape 120 will separate either between the panel-side adhesive component 121 and the release component 127 or between the substrate-side adhesive component 124 and the release component 127 rather than between the panel-side adhesive component 121 and the panel 110 or between the substrate-side adhesive component 124 and the substrate 140.

Figure 17:
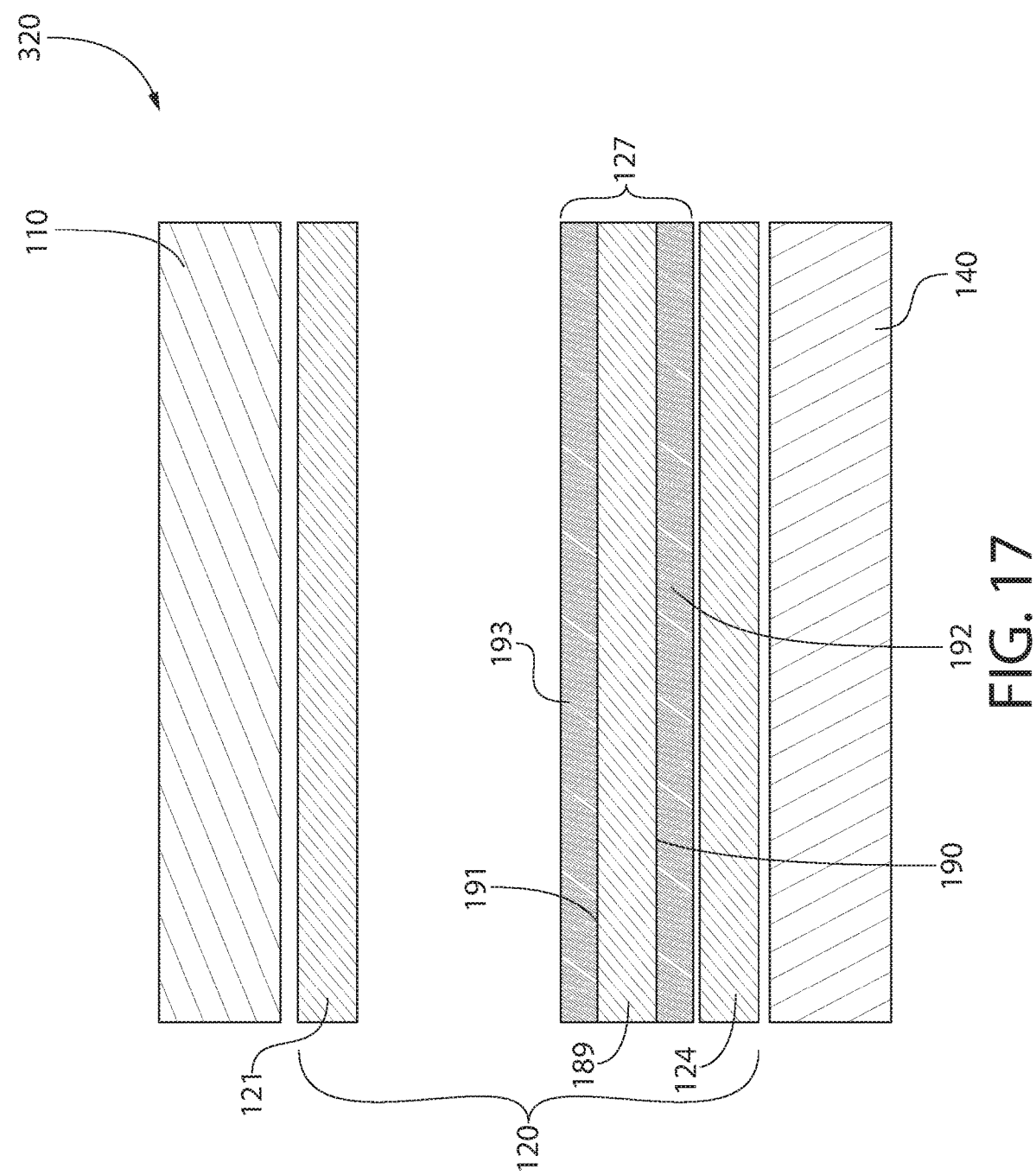
FIG. 17 is a schematic view of a surface covering system in accordance with a thirteenth alternative embodiment of the present invention.
Figure 18:
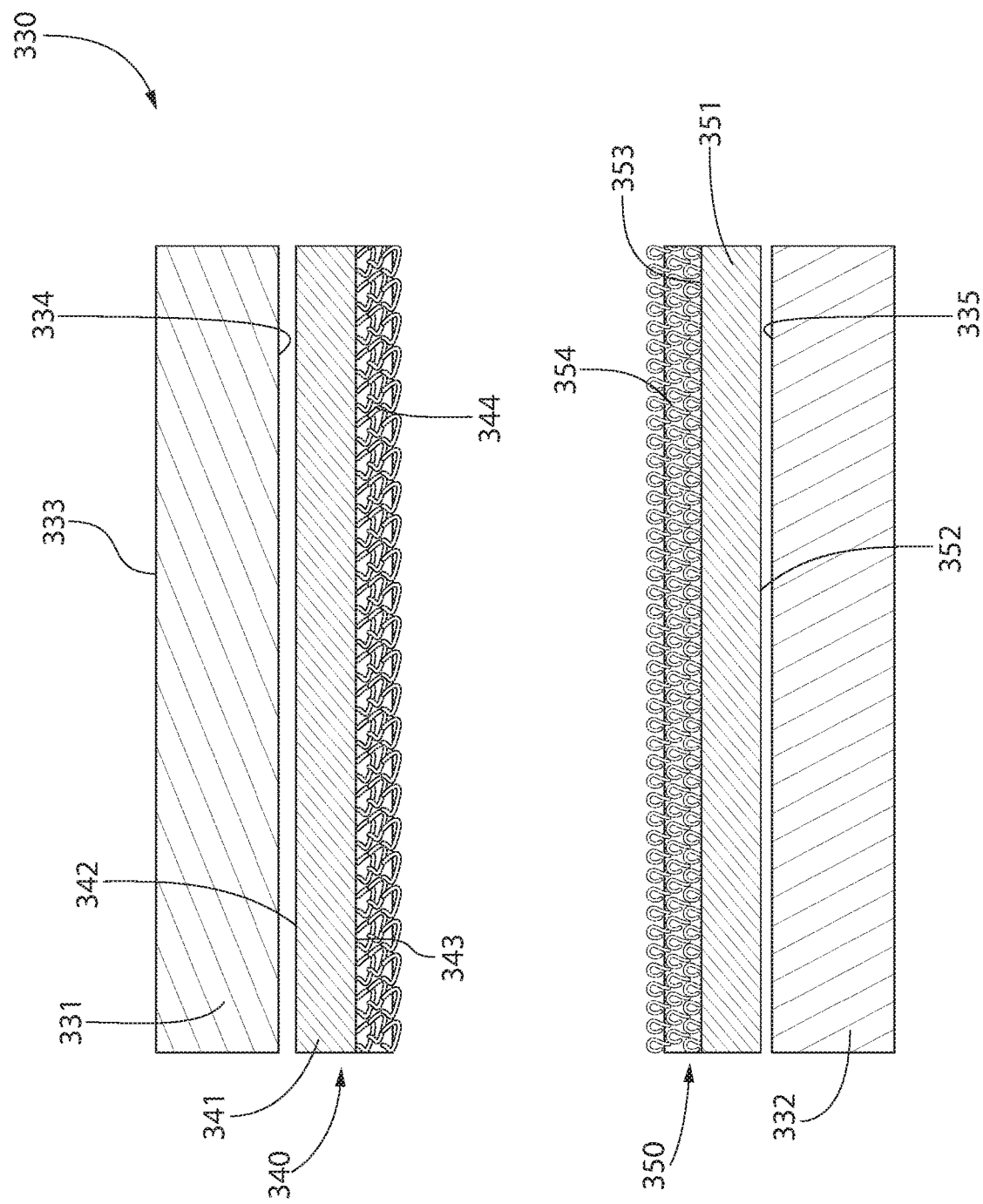
FIG. 18 is a schematic view of a surface covering system in accordance with a fourteenth alternative embodiment of the present invention.

FIG. 17 illustrates a surface covering system 320 that is a slight variation from the surface covering system 310 of FIG. 18. Specifically, in this embodiment the panel-side adhesive component 121 and the substrate-side adhesive component 124 are illustrated as a single adhesive layer. However, each of the panel-side and substrate-side adhesive components 124 may comprise one or more layers (including alternating adhesive and carrier layers). Furthermore, in this embodiment the release component 127 comprises an adhesive layer 189 having a first surface 190 and a second surface 191 opposite the first surface 190, a first carrier layer 192 on the first surface 190, and a second carrier layer 193 on the second surface 191. When assembled, an adhesive layer of the panel-side adhesive component 121 is adhered to the second carrier layer 193 of the release component 127 and an adhesive layer of the substrate-side adhesive component 124 is adhered to the first carrier layer 192 of the release component 127. In this embodiment, the adhesive layer 189 of the release component 127 has an adhesive strength that is less than an adhesive strength of the adhesive layer of the panel-side adhesive component 121 that is adhered to the second carrier layer 193 of the release component and less than an adhesive strength of the adhesive layer of the substrate-side adhesive component 124 that is adhered to the first carrier layer 192 of the release component 127. Thus, as has been described above, during removal of the panel 110 from the substrate 140, one of the first and second carrier layers 192, 193 of the release component 127 will separate from the adhesive layer 189 of the release component 127 before the panel-side adhesive component 121 separates from the panel 110 and before the substrate-side adhesive component 124 separates from the substrate 140.

Referring to FIG. 18, a surface covering system 330 is illustrated in accordance with yet another embodiment of the present invention. The surface covering system 330 comprises a panel 331, a substrate 332, a first connection component 340 and a second connection component 350. The details of the panels 110 provided above are applicable to the panel 331 and the details of the substrate 140 provided above are applicable to the substrate 332. The panel 331 has a front surface 333 and a rear surface 334 and the substrate 332 has an exposed outer surface 335.

The first connection component 340 comprises a first adhesive layer 341 having a first surface 342 and a second surface 343. The first connection component 340 also comprises a first connection layer 344 coupled to the second surface 343 of the first adhesive layer 341. The first connection component 340 is configured to be coupled to the panel 331 by adhering the first surface 342 of the first adhesive layer 341 to the rear surface 334 of the panel 331. When the first connection component 340 is coupled to the panel 331, the first connection layer 344 is exposed.

The second connection component 350 comprises a second adhesive layer 351 having a first surface 352 and a second surface 353. The second connection component 350 also comprises a second connection layer 354 coupled to the second surface 353 of the second adhesive layer 351. The second connection component 350 is configured to be coupled to the substrate 331 by adhering the first surface 352 of the second adhesive layer 351 to the exposed outer surface 335 of the substrate 332.

In the exemplified embodiment, the first connection layer 344 comprises hooks and the second connection layer 354 comprises loops. More specifically, each of the first and second connection layers 344, 354 may comprise a fabric-type material with at least one of hooks and/or loops thereon. Thus, the first and second connection components 340, 350 can be coupled together via interaction and engagement between the first and second connection layers 344, 354. Of course, the invention is not to be limited by the embodiment exemplified in FIG. 18. In alternative embodiments, the first connection layer 344 may comprise loops while the second connection layer 354 comprises hooks. In still other embodiments, both of the first and second connection layers 344, 354 may comprise hooks/loops that are capable of mating with one another to couple the first and second connection components 340, 350 together.

In this embodiment, the first connection component 340 is coupled to the panel 331 and the second connection component 350 is coupled to the substrate 332. Next, the panel 331 is moved towards the substrate 332 until the first connection layer 344 of the first connection component 340 engages/mates with the second connection layer 354 of the second connection component 350. The engagement between the first and second connection layers 344, 354 (i.e., the hooks and loops) couples the first and second connection components 340, 350 together, thereby coupling the panel 331 to the substrate 332.

The panel 331 can be removed from the substrate 332 by pulling on the panel 331 in a direction away from the substrate 331. Thus, in certain embodiments the first adhesive layer 341 of the first connection component 340 is connected to the panel 331 with a first bond strength, the second adhesive layer 351 of the second connection component 350 is connected to the substrate 332 with a second bond strength, and the first and second connection layers 344, 354 are connected to each other with a third bond strength. Preferably, the third bond strength is less than each of the first and second bond strengths. As a result, when pulling on the panel 331 during a removal operation, the connection between the first and second connection layers 344, 354 will break before the connection between the first adhesive layer 341 and the panel 331 and the connection between the second adhesive layer 351 and the substrate 332 breaks. Thus, when the panel 331 is separated from the substrate 332, the first connection component 340 remains adhered to the panel 331 and the second connection component 350 remains adhered to the substrate 332. In some embodiments, the first and second adhesive layers 341, 351 are removable adhesives so that the first adhesive layer 341 may later be removed/separated from the panel 331 without damaging the panel 331 and the second adhesive layer 351 may later be removed/separated from the substrate 332 without damaging the substrate 332.

Figure 19:
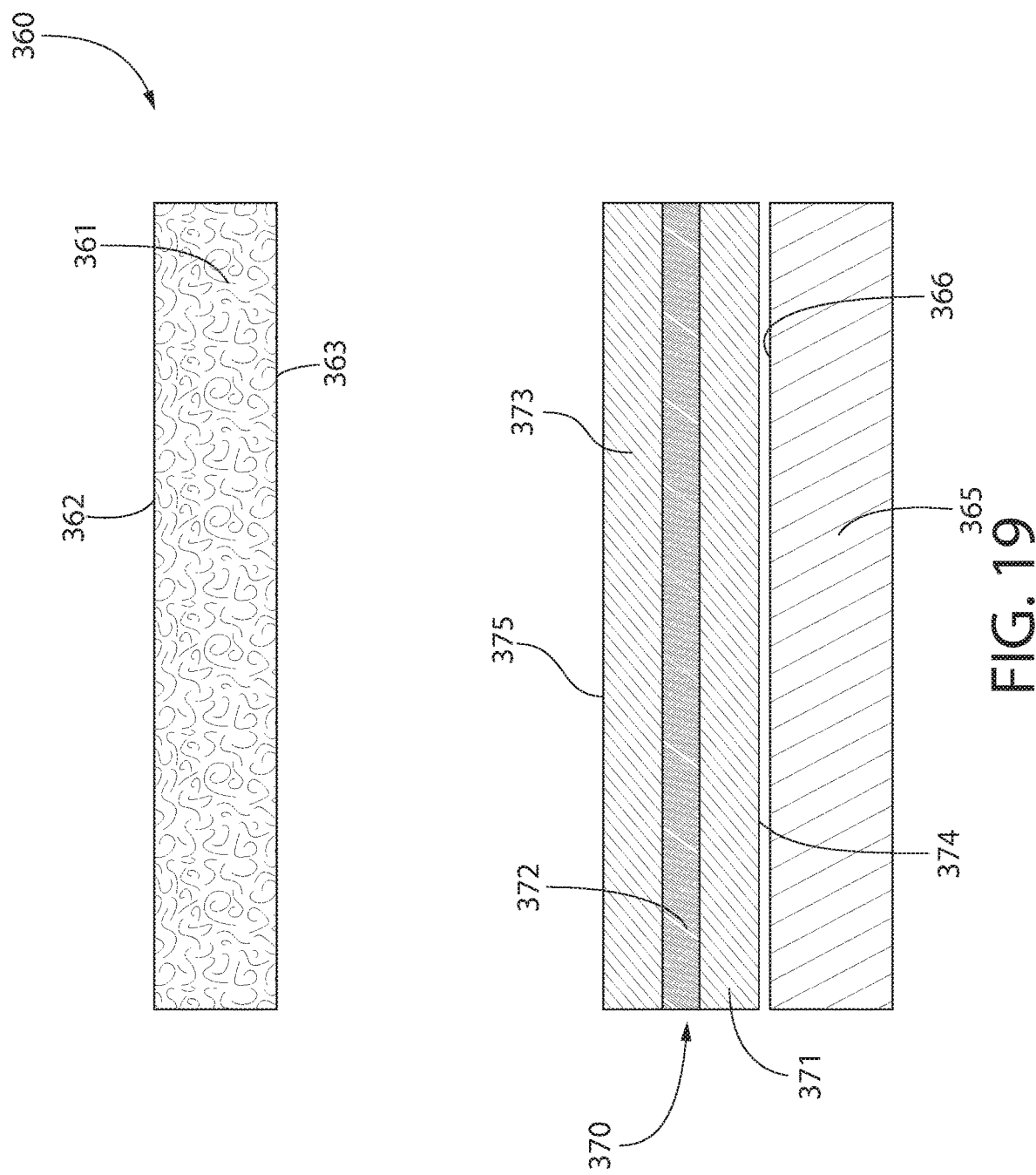
FIG. 19 is a schematic view of a surface covering system in accordance with a fifteenth alternative embodiment of the present invention.

Referring now to FIG. 19, a surface covering system 360 will be described in accordance with yet another embodiment of the present invention. The surface covering system 360 generally comprises a panel 361 (or a plurality of the panels 361) having a front surface 362 and a rear surface 363 opposite the front surface 362. In this embodiment, at least the rear surface 363 of the panel 361 comprises or is formed from weak surface strength material, for instance, a fibrous material that the surface fiber layer can be partially peeled/removed before the damage of the substrate surface during removal of a panel. The system 360 also comprises an adhesive tape 370. In the exemplified embodiment, the adhesive tape 370 comprises a first adhesive layer 371, a carrier layer 372, and a second adhesive layer 373. However, the invention is not to be so limited and in other embodiments the adhesive tape 370 may comprise only the first adhesive layer 371. In still other embodiments, the adhesive tape 370 may include additional carrier, adhesive and/or release component layers as may be desired (i.e., three adhesive layers and two carrier layers, four adhesive layers and three carrier layers, etc.). The system 360 also includes a substrate 365 having an outer surface 366 to which the panel 361 is configured to be coupled.

In this embodiment, the adhesive tape 370 is coupled to the substrate 365 and then the panels 361 are coupled to the adhesive tape 370. More specifically, the adhesive tape 370 comprises a first surface 374 and a second surface 375 opposite the first surface 373. Each of the first and surfaces 374, 375 is formed from an adhesive material (whether it is from a single adhesive layer or multiple adhesive layers as in the exemplified embodiment). The adhesive tape 370 is coupled to the substrate 365 by adhering the first surface 374 of the adhesive tape 370 to the exposed outer surface 366 of the substrate 365. The panel 361 is then coupled to the adhesive tape 370 by adhering the second surface 363 of the panel 361 (which is formed from a fibrous material) to the second surface 375 of the adhesive tape 370 (which is formed from an adhesive material).

When it is time to remove the panel 361 from the substrate 365, a user will pull on the panel 361 in a direction away from the substrate 365 until the panel 361 separates from the substrate 365. The panels 361 and the adhesive tape 370 are configured so that upon detaching one of the panels 361 from the substrate 365, the adhesive tape 370 remains coupled to the substrate 365. Furthermore, when the panels 361 are detached from the adhesive tape 370 (and from the substrate 365), at least a portion of the surface layer material of the rear surface 363 of the panel 361 remains attached or otherwise adhered to the adhesive tape 370. The adhesive tape 370 is also configured so that it can then later be separated from the substrate 365 without damaging the substrate 365. Thus, in this embodiment the panels 361 can be removed from the substrate 365 by peeling off some of the fibrous material/surface layer of the rear surface 363 of the panel 361 before any damage is done to the substrate 365 by separating the adhesive tape 370 from the substrate 365. In one embodiment, this occurs because the bond strength between the adhesive tape 370 and the substrate 365 is greater than the bond strength of the fibrous material to the panel 361. Thus, as the panel 361 is pulled away from the substrate 365, the fibrous material will separate from the panel 361 before the adhesive tape 370 separates from the substrate 365.

Referring to FIGS. 20A-20G, the process/method of installing one of the panels 110 onto the substrate 140 and removing the one of the panels 110 from the substrate 140 will be described. In FIGS. 20A-20G, the surface covering system 100 of FIGS. 1-4 is being used. However, it should be readily appreciated that any of the other surface covering systems 200, 210, 220, 230, 240, 250, 260, 270, 280, 290, 300, 310, 320, 330, 360 may be used in the same or a similar manner that would be easily understood and replicated by persons skilled in the art.

Figure 20A:
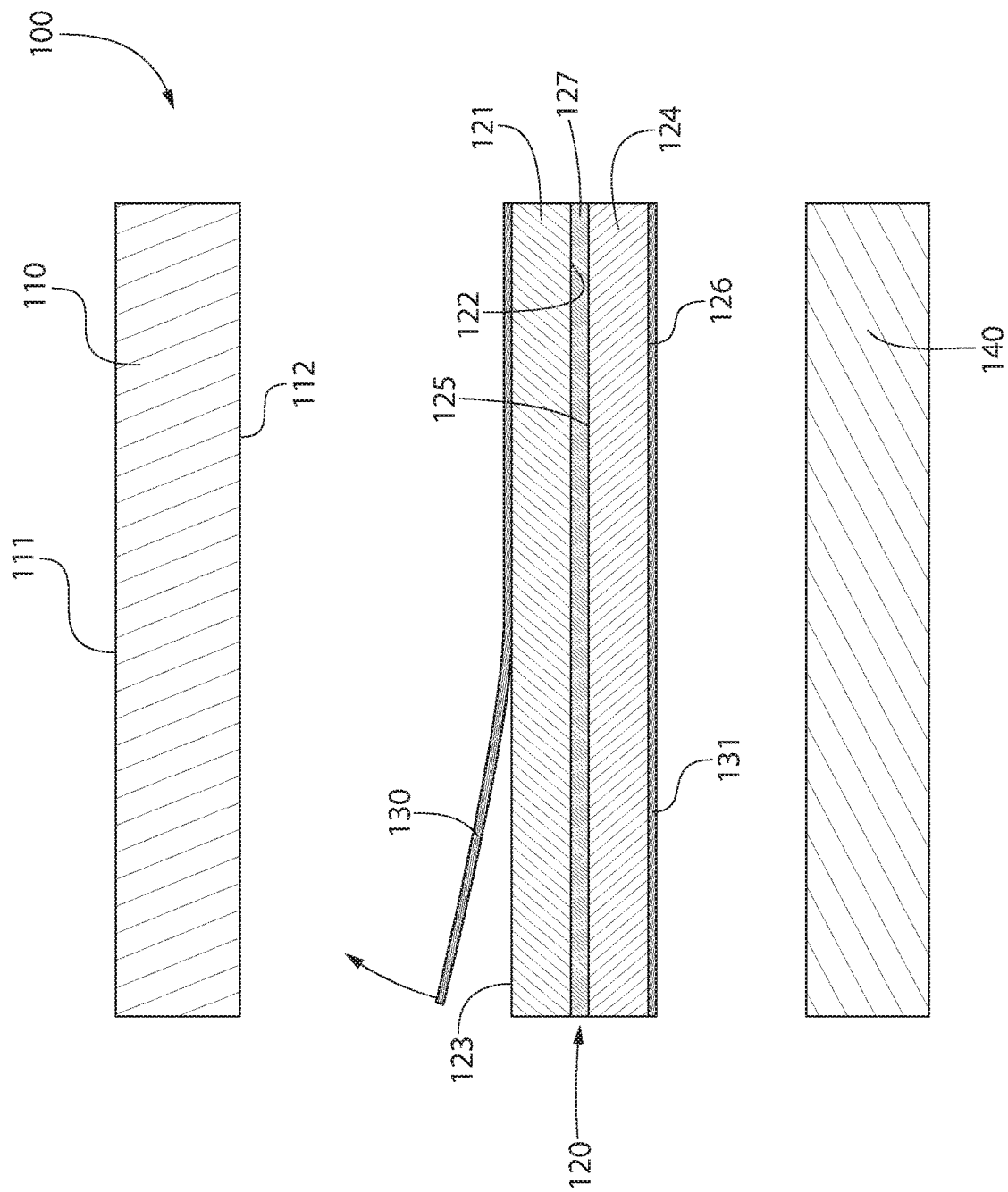
FIGS. 20A-20C illustrates a method of covering a surface with a panel using an adhesive tape in accordance with one embodiment of the present invention.

As shown in FIG. 20A, the first step in the process is to remove the first peelable liner 130 from the adhesive tape 120 to expose the second surface 123 of the panel-side adhesive component 121. Of course, it should be understood that the first step could alternatively be to remove the second peelable liner 131 from the adhesive tape 120 so that the second surface 126 of the substrate-side adhesive component 124 is exposed. The first step of removal of peelable liner 130 or 131 could be omitted for self-wound adhesive tape roll as the exposed adhesive side could be directly attached to the surface of panel or substrate. Moreover, as described herein in other embodiments the adhesive tape 120 may be prefabricated onto the rear surface 112 of the panel 110 and thus this step would not be needed.

Figure 20B:
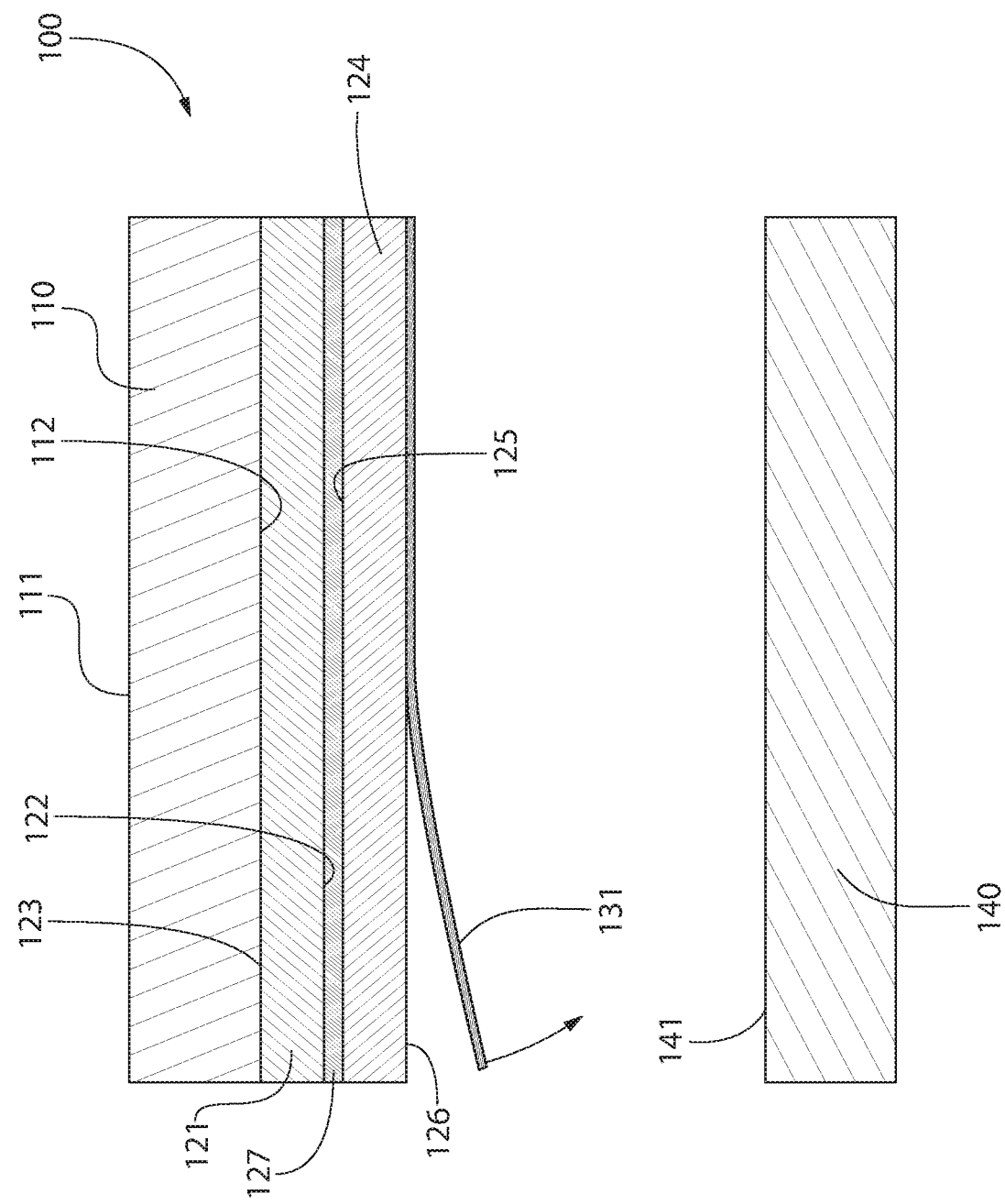

Next, referring to FIG. 20B, the adhesive tape 120 is adhered to the rear surface 112 of the panel 110. Specifically, the adhesive tape 120 is positioned so that the second surface 123 of the panel-side adhesive component 121 is in surface contact with the rear surface 112 of the panel 110. As a result of this surface contact and because the second surface 123 of the panel-side adhesive component 121 is an adhesive surface, the adhesive tape 120 becomes adhered to the panel 110. Of course, if the second peelable liner 131 were removed in the first step, the next step would be to adhere the adhesive tape 120 to the substrate 140 rather than to the panel 110. Still referring to FIG. 20B, in accordance with the embodiment shown, the next step is to remove the second peelable liner 131 from the remainder of the adhesive tape 120 to expose the second surface 126 of the substrate-side adhesive component 124.

Figure 20C:
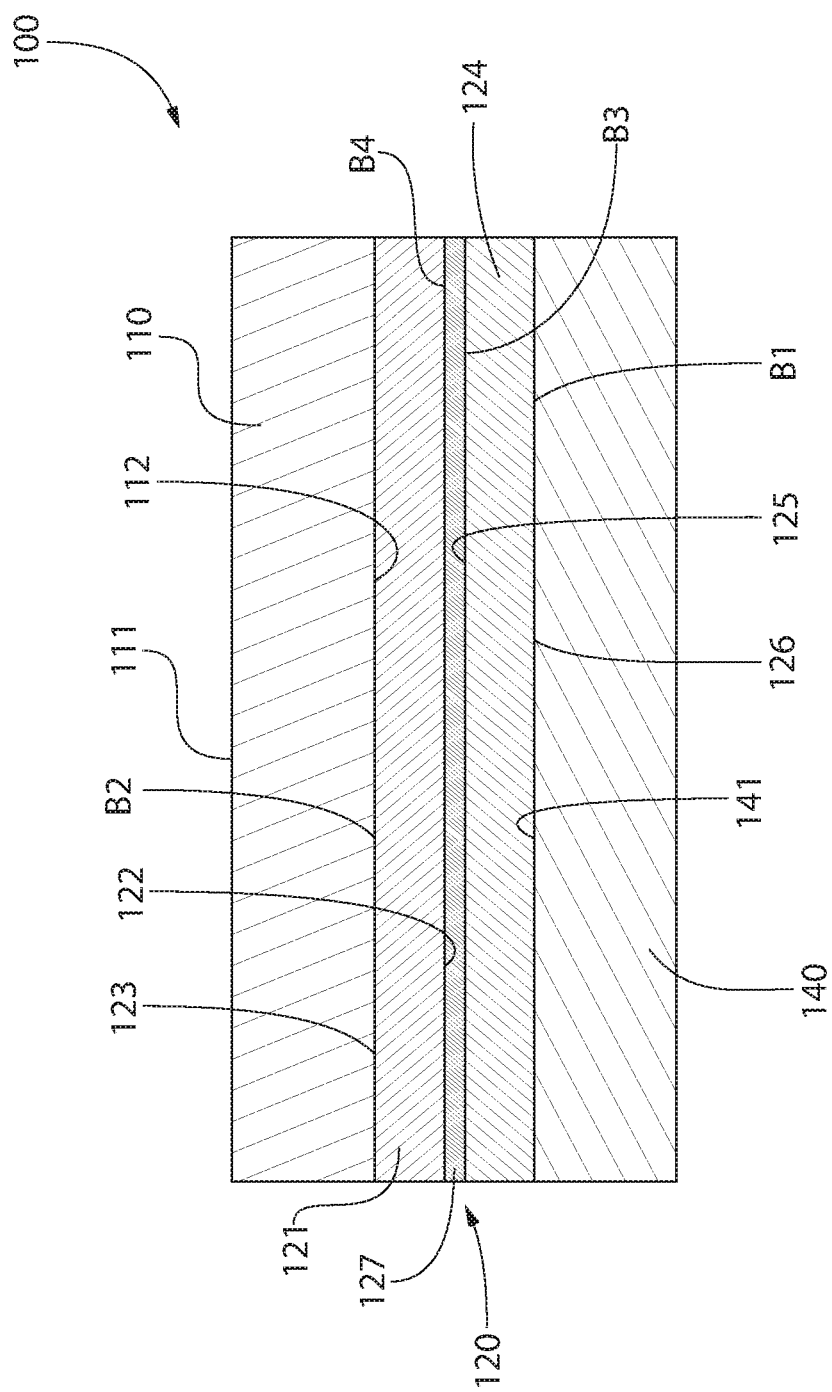
Figure 20D:
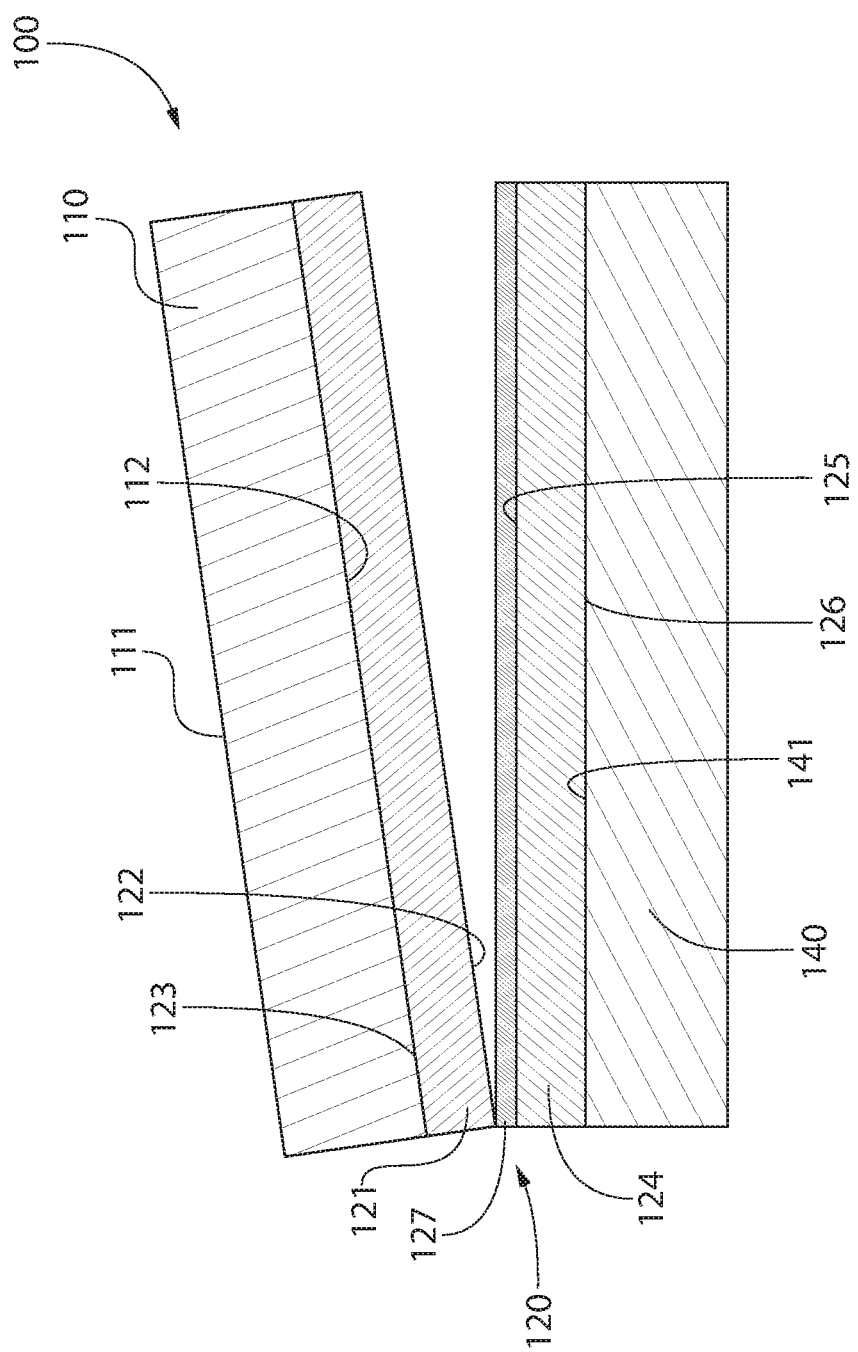
Figure 20F:
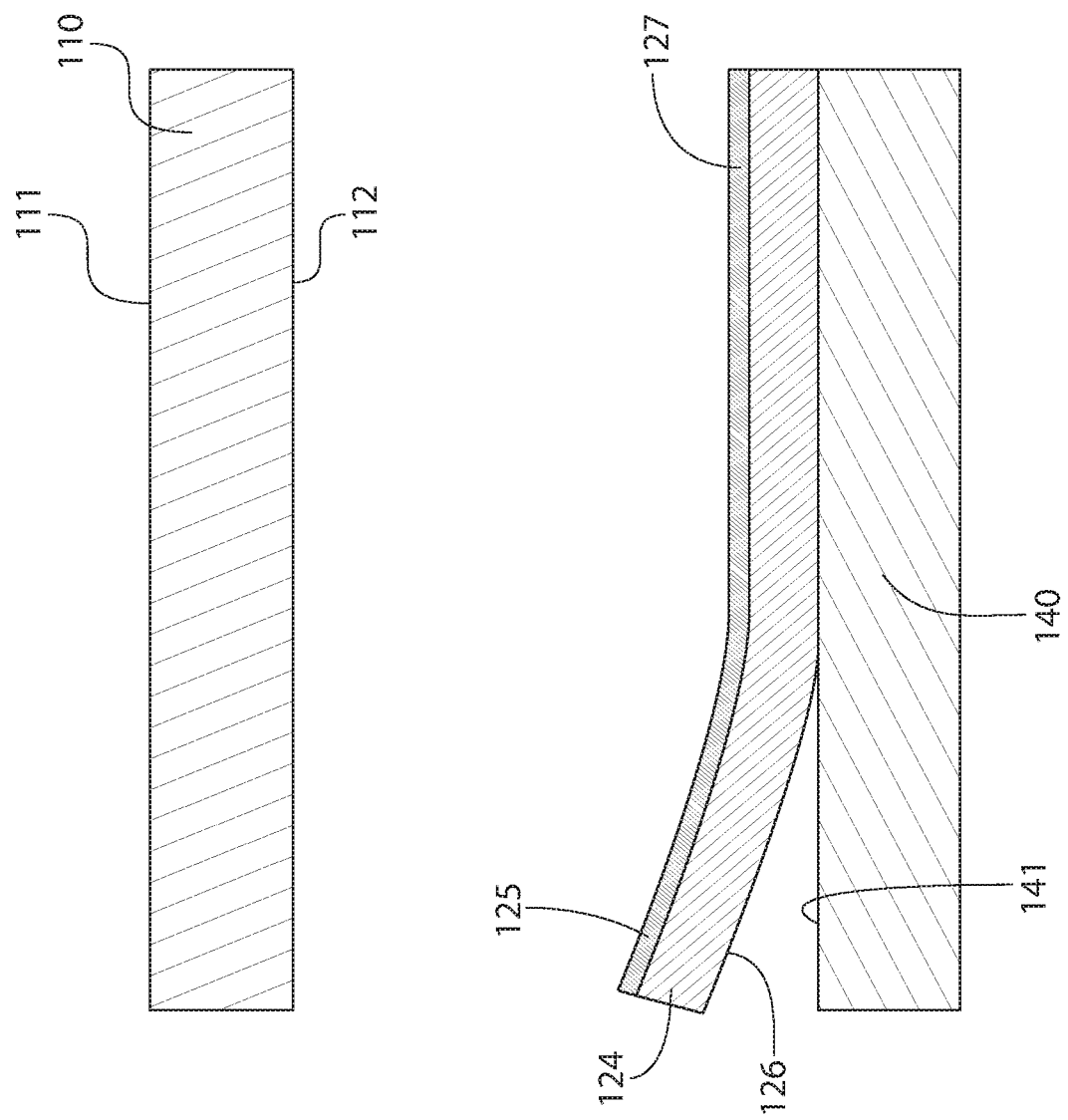

Referring to FIG. 20C, the next step is to move the panel 110 with the adhesive tape 120 thereon into contact with the exposed outer surface 141 of the substrate 140. More specifically, the panel 110 is moved towards the substrate 140 until the second surface 126 of the substrate-side adhesive component 124 (which is formed from or comprises an adhesive material) contacts the exposed outer surface 141 of the substrate 140, thereby adhering the adhesive tape 120 to the substrate 140. At this point in the installation, the panel 110 is coupled to the substrate 140 with the adhesive tape 120. Specifically, the second surface 123 of the panel-side adhesive component 121 is adhered to the panel 110 and the second surface 126 of the substrate-side adhesive component 124 is adhered to the substrate 140. Furthermore, the release component 127 is positioned between the panel-side and substrate-side adhesive components 121, 124. More specifically, the release component 127 is located directly between the first surface 122 of the panel-side adhesive component 121 and the first surface 125 of the substrate-side adhesive component 124.

Thus, upon completing the step shown in FIG. 20C, the panel 110 is coupled to the substrate 140. These steps can be repeated to couple a plurality of the panels 110 to the substrate 140. In one embodiment, strips of the adhesive tape 120 can be coupled to the substrate 140 and then a plurality of the panels 110 may be separately positioned on the substrate 140 in contact with the adhesive tape 120 to couple the panels 110 to the substrate 140. In other embodiments, the adhesive tape 120 may be coupled to the panels 110 first and then the panels 110 may be coupled to the substrate 140. In still another embodiment, the panel-side adhesive component 121 may be coupled to the panels 110, the substrate-side adhesive component 124 may be coupled to the substrate 140, and then the panels 110 may be coupled to the substrate 140 by aligning the panel-side adhesive component 121 with the substrate-side adhesive component 124 and pressing them into contact with one another. Thus, there are several different ways that coupling the panels 110 to the substrate 140 can be achieved.

When the panel 110 is coupled to the substrate 140, the substrate-side-adhesive component 124 is coupled to the substrate 140 with a first bond strength B1, the panel-side adhesive component 121 is coupled to the panel 110 with a second bond strength B2, the substrate-side adhesive component 124 is coupled to the release component 127 with a third bond strength B3, and the panel-side adhesive component 121 is coupled to the release component 127 with a fourth bond strength B4. In certain embodiments, at least one of the third and fourth bond strengths B3, B4 is less than each of the first and second bond strengths B1, B2 to facilitate the manner in which the adhesive tape 120 separates when the panel 110 is being removed from the substrate 140, as discussed below with reference to FIGS. 20D-20G.

FIGS. 20D-20G illustrate the method of removing the panels 110 from the substrate 140. To remove the panels 110 from the substrate 140, a user will pull on the panels 110 in a direction away from the substrate 140 with a force that is greater than at least one of the third and fourth bond strengths B3, B4. In the exemplified embodiment, as the user pulls on the panel 110, the adhesive tape 120 separates at the interface of the panel-side adhesive component 121 and the release component 127. Of course, in other embodiments the adhesive tape 120 may separate at the interface of the substrate-side adhesive component 124 and the release component 127. However, it is preferable to have the adhesive tape 120 separate at the interface of the release component 127 with one of the panel-side and substrate-side adhesive components 121, 124 rather than at one of the interface of the panel-side adhesive component 121 and the panel 110 and the interface of the substrate-side adhesive component 124 and the substrate 140. This is preferable because if the adhesive tape 120 were to separate from the substrate 140 or the panel 110 during this removal step, there is a higher likelihood that one of the panel 110 and the substrate 140 would be damaged in the process.

Thus, in the exemplified embodiment, as the panel 110 is pulled from the substrate 140, the panel-side adhesive component 121 remains coupled/adhered to the rear surface 112 of the panel 110 and the substrate-side adhesive component 124 remains coupled/adhered to the exposed outer surface 141 of the substrate 140. As a result, no damage is done to the panel 110 or the substrate 140 at this step because no adhesive has been removed from the panel 110 or the substrate 140. This allows the user to take a more precise approach when removing the adhesive materials from the panel 110 and the substrate 140 to prevent damage of those components. Another benefit is that the removed panel 110 could be reused by attaching to the substrate 140. Multiple cycles of attaching and removing panel 110 on substrate 140 is also possible.

Referring to FIG. 20E, after the panel 110 has been separated from the substrate 140, the panel-side adhesive component 121 may be removed from the panel 110. This can be achieved in any desired manner, such as the user peeling, cutting, pulling, or otherwise removing the panel-side adhesive component 121 away from the panel 110. As discussed herein, in some embodiments the panel-side adhesive component 121 may comprise a removable adhesive, at least on the second surface 123 thereof, which will allow for the panel-side adhesive component 121 to be removed from the panel 110 without damaging the panel 110.

Referring to 20F, the substrate-side adhesive component 124 may also then be removed from the substrate 140. Of course, the substrate-side adhesive component 124 could be removed before the panel-side adhesive component 121 is removed. This makes no difference. In fact, in some embodiments the panel-side adhesive component 121 may not be removed from the panel 110 but may instead be left thereon for re-use. Nonetheless, removing the substrate-side adhesive component 124 from the substrate 140 can be achieved in any desired manner, such as the user peeling, cutting, pulling, or otherwise removing the substrate-side adhesive component 124 away from the substrate 140. As discussed herein, in some embodiments the substrate-side adhesive component 124 may comprise a removable adhesive, at least on the second surface 126 thereof, which will allow for the substrate-side adhesive component 124 to be removed from the substrate 140 without damaging the substrate 140.

FIG. 20G illustrates the panel 110 and the substrate 140 separated from one another without the adhesive tape 120 present. The panel 110 and the substrate 140 have suffered no damage during the removal of the adhesive tape 120 therefrom.

Figure 21:
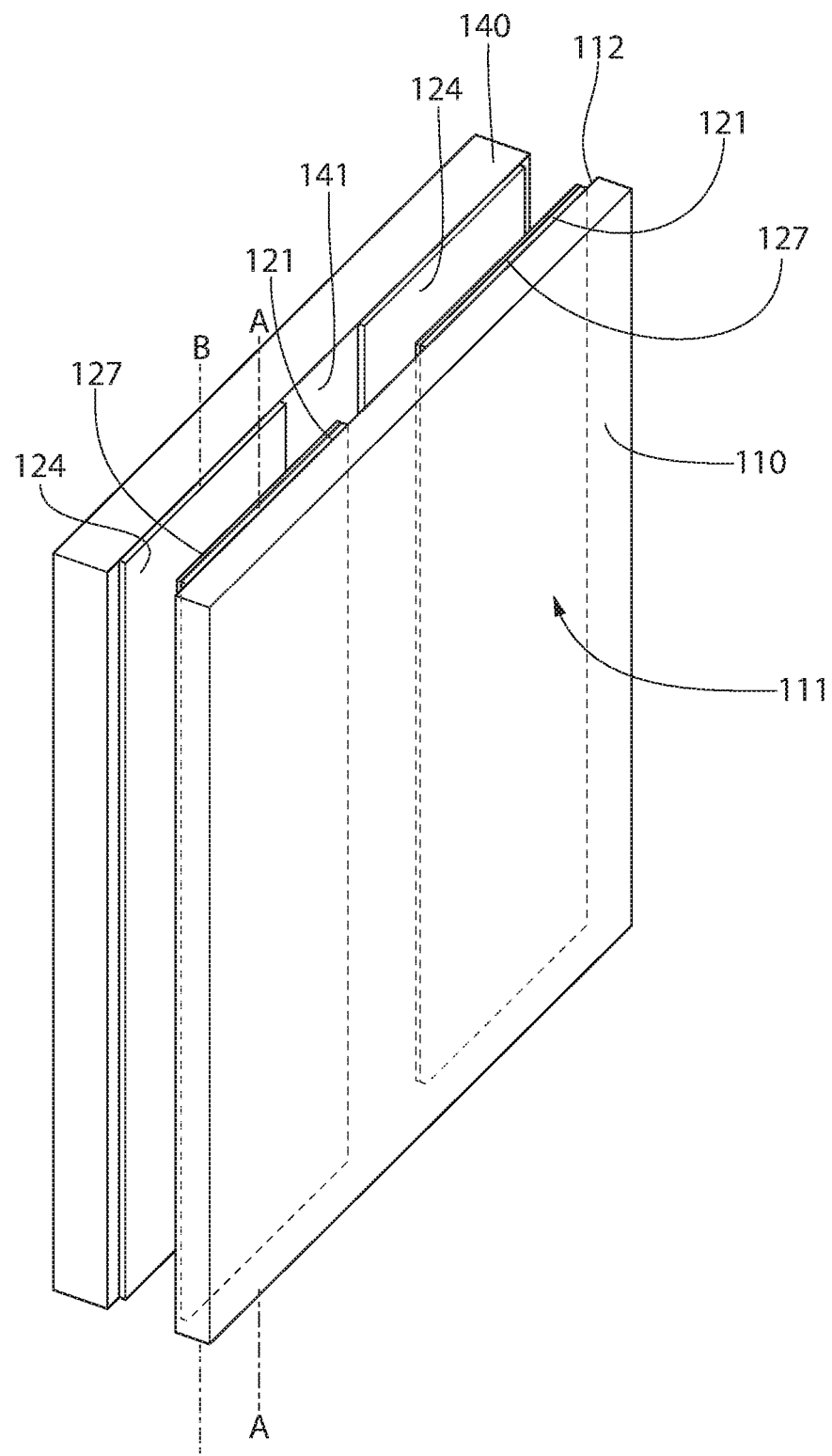
FIG. 21 is a perspective view illustrating a panel having a panel-side adhesive component thereon and a substrate having a substrate-side adhesive component thereon, wherein the panel-side and adhesive-side components are arranged parallel to one another.
Figure 22:
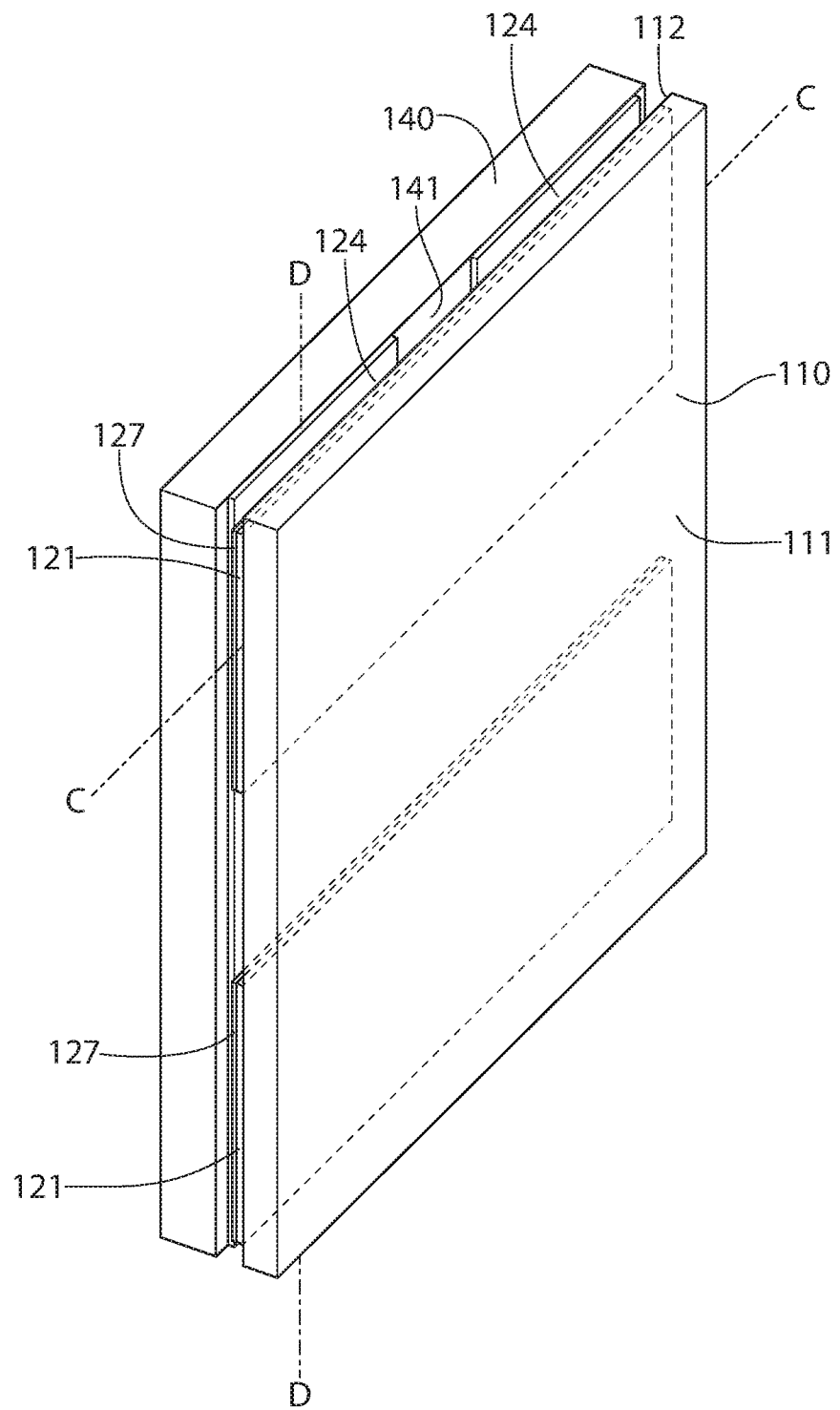
FIG. 22 is a perspective view illustrating a panel having a panel-side adhesive component thereon and a substrate having a substrate-side adhesive component thereon, wherein the panel-side and adhesive-side components are arranged perpendicular to one another.

FIGS. 21 and 22 illustrate additional methods of coupling one of the panels 110 to the substrate 140. In FIG. 21, one or more strips of the substrate-side adhesive component 124 are adhered to the exposed outer surface 141 of the substrate 140 and one or more strips of the panel-side adhesive component 121 are adhered to the rear surface 112 of the panel 110. The coverage of the panel-side adhesive component 121 to the rear surface 112 can be 100% or at any other desired percentage. Similarly, the coverage of substrate surface with substrate-side adhesive component 124 can be 100% or at any other desired percentage. In FIG. 21, the release component 127 is illustrated attached to the panel-side adhesive component 121, but in an alternative embodiment the release component 127 could be attached to the substrate-side adhesive component 124.

In FIG. 21, there are two strips of the panel-side adhesive component 121 that are elongated in a first direction and there are two strips of the substrate-side adhesive component 124 that are elongated in a second direction. Stated another way, the panel-side adhesive component 121 is elongated along a first axis A-A and the substrate-side adhesive component 124 is elongated along a second axis B-B. In FIG. 21, the first and second directions (and hence also the first and second axes A-A, B-B) are parallel to one another. However, the invention is not to be so limited in all embodiments. FIG. 22 illustrates the same thing as FIG. 21, except in FIG. 22 the second direction (i.e., the second axis D-D) along which the strips of the substrate-side adhesive component 124 are elongated is perpendicular to the first direction (i.e., the first axis C-C) along which the strips of the panel-side adhesive component 121 are elongated. In various embodiments, the first and second directions (and also the first and second axes along which the strips of adhesive component are elongated) may be parallel to one another, non-parallel to one another, perpendicular to one another, or oblique to one another. With each of these various relative orientations of the strips of the panel-side and substrate-side adhesive components 121, 124, the adhesive tape 120 will still function in the manner disclosed herein.

Figure 23:
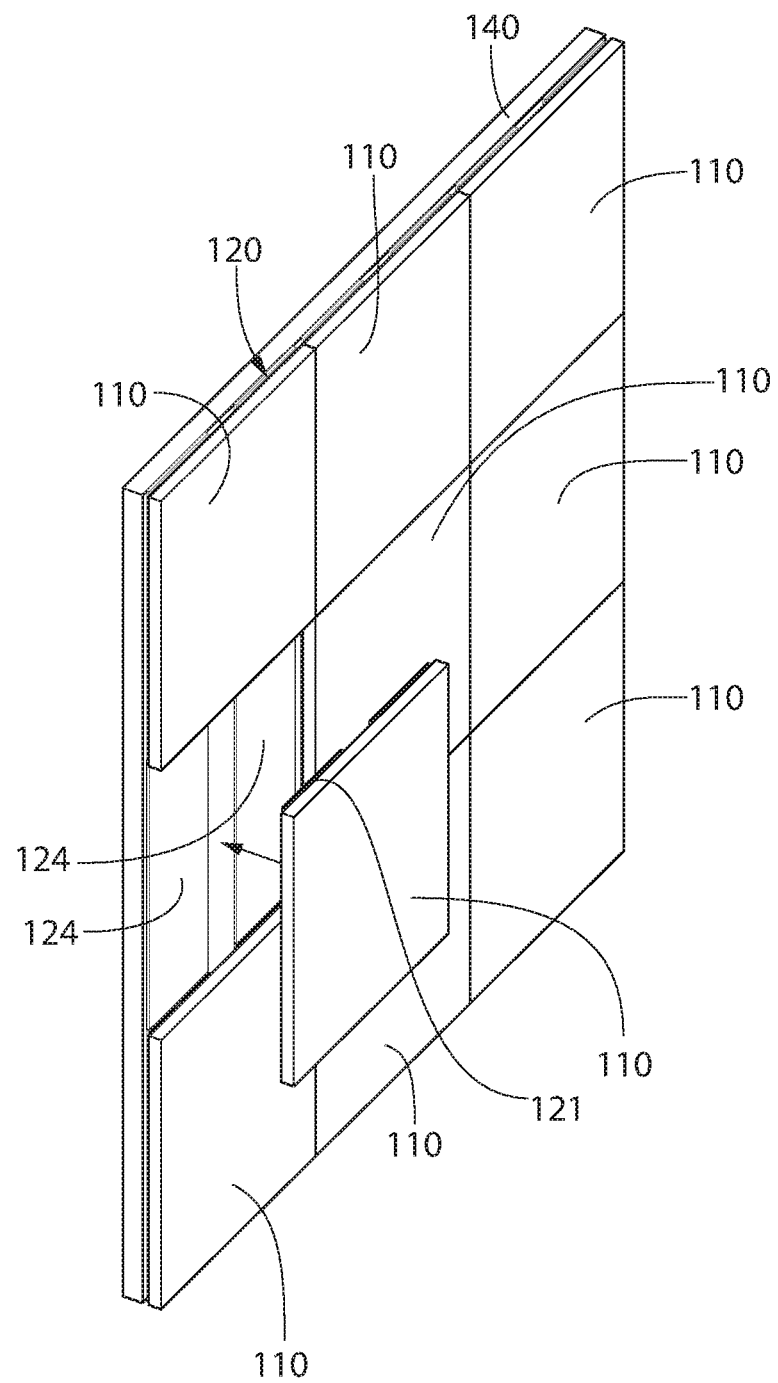
FIG. 23 is a perspective view illustrating a substrate having a plurality of panels thereon and illustrating an additional panel being coupled to the substrate.
Figure 24:
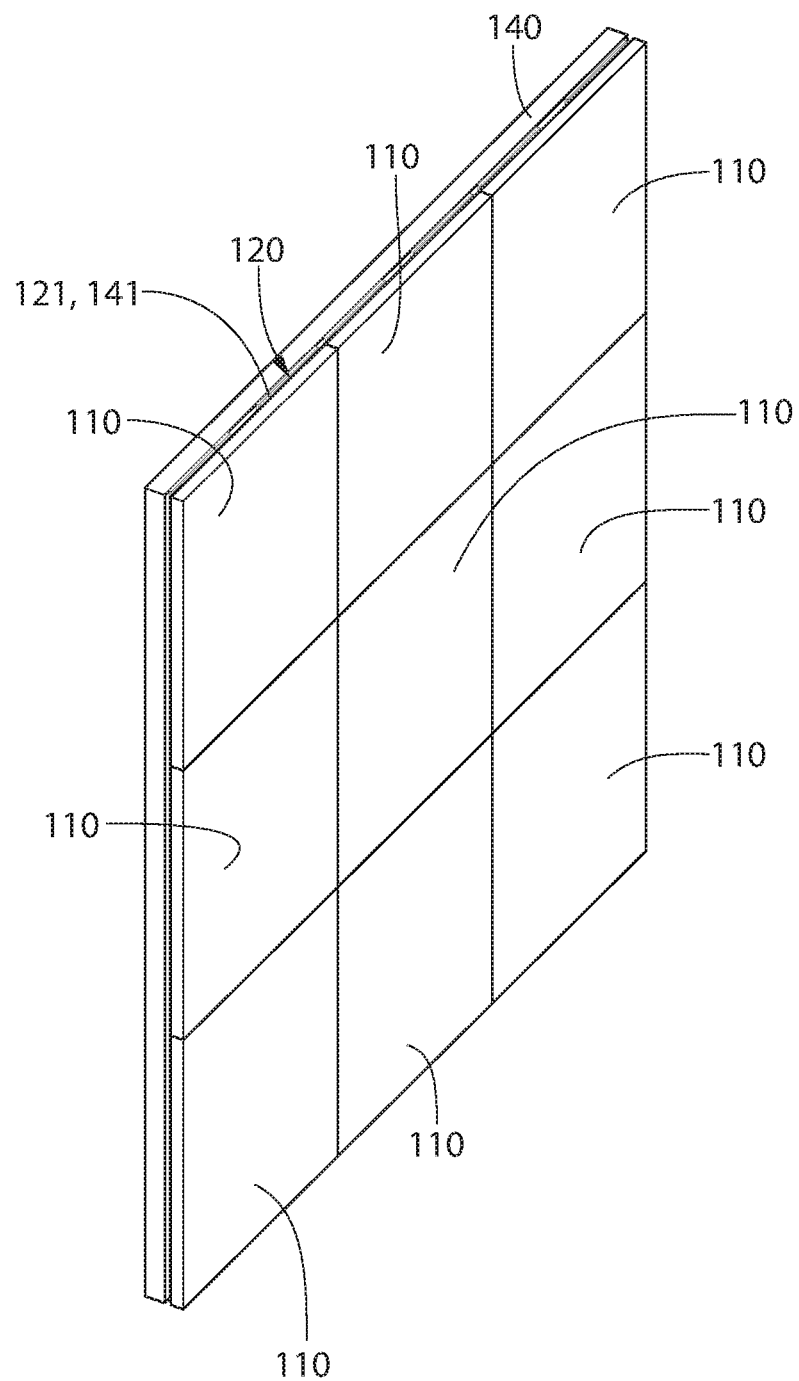
FIG. 24 is a perspective view illustrating the substrate of FIG. 23 with the plurality of panels including the additional panel coupled to the substrate.

FIGS. 23 and 24 illustrate the process of coupling a plurality of the panels 110 to the substrate 140, which in this case is a wall. As noted above, the substrate 140 could alternatively be a ceiling, a floor, or any other surface which one might desire to cover with panels or some other decorative component. In FIG. 23, eight of the panels 110 are already coupled to the substrate 140 in the manner described herein and a ninth panel 110 is in position to be coupled to the substrate 140 using the panel-side and substrate-side adhesive components 121, 124 of the adhesive tape 120. FIG. 24 illustrates the ninth panel 110 also installed on the substrate 140.

In FIG. 24, the panels 110 are detachably coupled to the substrate 140 by the adhesive tape 120 in a side-by-side arrangement to cover the substrate 140. In FIG. 24, the panels 110 collectively cover the entirety of the substrate 140. However, the panels 110 may cover just a portion of the substrate 140 rather than the entire substrate 140 in other embodiments. For example, a user may desire to only cover a portion of a wall with wall panels rather than covering the entire wall in order to achieve a desired aesthetic. When used on a wall, the panels 110 could form a backsplash, a headboard, or any other type of wall covering. The panels 110 may all have the same color, texture, pattern, or they may collectively form a pattern or design, or they may have a random color, texture, and/or pattern. For example, the panels 110 could have a wood grain pattern, a brick-like pattern, a stone-like appearance, or any other pattern to create a desired aesthetic.

In the embodiment exemplified in FIGS. 23 and 24, the panels 110 are square shaped panels such that when they are arranged side-by-side on the substrate 140, their edges are lined up with one another. The panels 110 could be arranged in an aligned manner as shown or they could be staggered. Moreover, as noted above the panels 110 can have any desired shape, including polygons, round shapes, and irregular shapes. The panels 110 could be arranged on the substrate in a spaced apart manner in some embodiments rather than having their edges abutted against each other as with the exemplified embodiment. Furthermore, the side-by-side arrangement of the panels 110 could include tongue-andgroove arrangements or shiplap arrangements. Thus, the term side-by-side arrangement includes an arrangement where the edges of adjacent panels 110 are abutted against one another, spaced apart from one another, aligned with one another, overlapping one another such as having a shiplap or tongue-and-groove arrangement, or any other desired arrangement. It merely means that a plurality of the panels 110 are coupled to the same surface (i.e., wall, floor, ceiling, or the like).

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed:

1. An apparatus for covering a wall or ceiling, the apparatus comprising:
    a panel comprising a rear surface;
    an adhesive tape prefabricated onto the rear surface of the panel, the adhesive tape comprising:
        a panel-side adhesive component comprising at least one permanent adhesive layer that is permanently adhered to the rear surface of the panel;
        a substrate-side adhesive component comprising at least one adhesive layer facing away from the panel;
        a release component positioned between the panel-side adhesive component and the substrate-side adhesive component; and
        a release liner covering the at least one adhesive layer of the substrate-side adhesive; and
    wherein the panel is configured to be coupled to the wall or the ceiling by removing the release liner from the at least one adhesive layer of the substrate-side adhesive component and placing the at least one adhesive layer of the substrate-side adhesive component into direct surface contact with an outer surface of the wall or the ceiling; and
    wherein the adhesive tape is configured to separate at an interface between the release component and one of the panel-side and substrate-side adhesive components upon application of a removal force onto the panel to detach the apparatus from the wall or the ceiling.

2. The apparatus according to claim 1 wherein the at least one adhesive layer of the panel-side adhesive component comprises a first adhesive strength, the at least one adhesive layer of the substrate-side adhesive component comprises a second adhesive strength, and the release component comprises at least one adhesive layer having a third adhesive strength, the second adhesive strength being greater than the third adhesive strength.

3. The apparatus according to claim 1 wherein the release component comprises a release coating.

4. The apparatus according to claim 1 wherein the substrate-side adhesive component comprises a plurality of adhesive layers that are separated from one another by one or more carrier layers, wherein the plurality of adhesive layers of the substrate-side adhesive component comprises a first adhesive layer and a second adhesive layer that is positioned between the first adhesive layer and the panel-side adhesive component, the first adhesive layer having a greater adhesive strength than the second adhesive layer.

5. A surface covering system comprising:
    a plurality of panels, each of the panels comprising a front surface and a rear surface opposite the front surface;
    an adhesive tape configured to detachably couple the panels to a substrate, the adhesive tape comprising:
        a substrate-side adhesive component comprising a removable adhesive layer;
        a panel-side adhesive component comprising a permanent adhesive layer; and
        a release component;
    wherein the adhesive tape is an integral laminate structure such that the substrate-side adhesive component, the panel-side adhesive component, and the release component are attached as a single unit prior to use of the adhesive tape;
    wherein the panels are detachably coupled to the substrate by the adhesive tape in a side-by-side arrangement to cover the substrate, the removable adhesive layer of the substrate-side adhesive component being adhered directly to the substrate, the permanent adhesive layer of the panel-side adhesive component being adhered directly to the rear surfaces of the panels, and the release component being positioned between the substrate-side adhesive component and the panel-side adhesive component;
    wherein the adhesive tape is configured so that upon detaching one of the panels from the substrate, the adhesive tape separates at an interface between the substrate-side adhesive component and the release component or at an interface between the panel-side adhesive component and the release component;
    wherein the substrate-side adhesive component is configured to be removed from the substrate without damaging the substrate; and
    wherein the substrate is a wall or a ceiling.

6. The system according to claim 5 wherein the adhesive tape is configured so that upon detaching one of the panels from the substrate: (1) the adhesive tape separates at the interface between the release component and the substrate-side adhesive component and an entirety of the release component remains coupled to the panel-side adhesive component; (2) the substrate-side adhesive component remains coupled to the substrate; and (3) the panel-side adhesive component remains coupled to the rear surface of the one of the panels.

7. The system according to claim 5 wherein the release component comprises an adhesive layer having an adhesive strength that is less than an adhesive strength of the permanent adhesive layer of the panel-side adhesive component and the removable adhesive layer of the substrate-side adhesive component.

8. The system according to claim 5 wherein an entirety of the adhesive tape including the panel-side adhesive component, the substrate-side adhesive component, and the release component is prefabricated onto the rear surface of the panel with the permanent adhesive layer of the panel-side adhesive component adhered to the rear surface of the panel, the release component located between the panel-side adhesive component and the substrate-side adhesive component, and the removable adhesive layer of the substrate-side adhesive component facing away from the panel.

9. The system according to claim 8 further comprising a release liner covering the removable adhesive layer of the substrate-side adhesive component.

10. The system according to claim 5 wherein the release component comprises a release coating disposed directly between the removable adhesive layer and the permanent adhesive layer, the release component being free of any adhesive.

11. The system according to claim 5 wherein the substrate-side adhesive component is coupled to the substrate with a first bond strength, the panel-side adhesive component is coupled to the rear surface of the panel with a second bond strength, the substrate-side adhesive component is coupled to the release component with a third bond strength, and the panel-side adhesive component is coupled to the release component with a fourth bond strength, and wherein at least one of the third and fourth bond strengths is less than each of the first and second bond strengths.

12. The system according to claim 5 wherein the adhesive tape is a unitary laminate structure comprising the substrate-side adhesive component, the panel-side adhesive component, and the release component between the substrate-side and panel-side adhesive components.

13. The system according to claim 5 wherein the substrate-side adhesive component comprises a plurality of adhesive layers and a carrier layer between adjacent ones of the plurality of adhesive layers, the plurality of adhesive layers comprising a first adhesive layer that is in contact with the substrate and a second adhesive layer that is separated from the first adhesive layer by a first carrier layer, the first adhesive layer having a first adhesive strength and the second adhesive layer having a second adhesive strength, the first adhesive strength being greater than the second adhesive strength.

14. The system according to claim 5 wherein the removable adhesive layer comprises a first surface that is in contact with the substrate and a second surface opposite the first surface, wherein the permanent adhesive layer comprises a first surface that is in contact with the rear surface of the panel and a second surface opposite the first surface, and wherein the release component is in contact with the second surface of the removable adhesive layer and the second surface of the permanent adhesive layer.

15. The system according to claim 5 wherein the adhesive tape consists of the substrate-side adhesive component, the panel-side adhesive component, and the release component.

* * * * *